United States Patent
Balasubramanian et al.

(10) Patent No.: US 11,653,375 B2
(45) Date of Patent: May 16, 2023

(54) TRANSMIT POWER ADJUSTMENT FOR FULL DUPLEX FEEDBACK

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 17/155,728

(22) Filed: Jan. 22, 2021

(65) Prior Publication Data

US 2022/0240256 A1   Jul. 28, 2022

(51) Int. Cl.
| | |
|---|---|
| *H04W 72/08* | (2009.01) |
| *H04W 72/04* | (2009.01) |
| *H04L 5/14* | (2006.01) |
| *H04L 5/00* | (2006.01) |

(Continued)

(52) U.S. Cl.
CPC ......... *H04W 72/082* (2013.01); *H04L 5/0042* (2013.01); *H04L 5/1461* (2013.01); *H04W 52/243* (2013.01); *H04W 72/0413* (2013.01); *H04W 88/06* (2013.01)

(58) Field of Classification Search
CPC ............. H04W 72/082; H04W 52/243; H04W 72/0413; H04W 88/06; H04W 52/281; H04W 52/325; H04W 52/383; H04W 92/18; H04L 5/0042; H04L 5/1461; H04L 5/0055; H04L 5/14
See application file for complete search history.

(56) References Cited

U.S. PATENT DOCUMENTS

| | | | |
|---|---|---|---|
| 2019/0068253 A1* | 2/2019 | Venkatachalam Jayaraman ......... | H04W 52/262 |
| 2019/0132838 A1* | 5/2019 | Yi ..................... | H04W 72/0446 |
| 2020/0022089 A1 | 1/2020 | Guo | |

(Continued)

FOREIGN PATENT DOCUMENTS

| | | |
|---|---|---|
| EP | 2242318 A1 | 10/2010 |
| EP | 3672337 A2 | 6/2020 |

OTHER PUBLICATIONS

International Search Report and Written Opinion—PCT/US2021/062017—ISA/EPO—dated Mar. 23, 2022.

*Primary Examiner* — Hoang-Chuong Q Vu
(74) *Attorney, Agent, or Firm* — Holland & Hart LLP

(57) ABSTRACT

Methods, systems, and devices for wireless communications are described. In some examples, a user equipment (UE) operating according to full duplex (e.g., transmit and receive concurrently) may adapt a transmit power of a sidelink feedback message based on priorities of data messages. For example, the UE may determine a priority of a first data message received at the UE in a previous slot and a priority of a second data message transmitted to the UE in a previous slot. Based on a comparison of the priorities of the data messages, the UE may adjust a transmit power for a feedback message indicating a decoding outcome of the first data message and transmit the feedback message according to the adjusted transmit power while receiving a feedback message indicating the decoding outcome of the second data message thereby increasing efficiency while reducing interference.

30 Claims, 12 Drawing Sheets

(51) Int. Cl.
*H04W 52/24* (2009.01)
*H04W 88/06* (2009.01)

(56) References Cited

U.S. PATENT DOCUMENTS

| | | | |
|---|---|---|---|
| 2020/0337085 A1* | 10/2020 | Dong | H04L 5/14 |
| 2020/0396599 A1 | 12/2020 | Luo et al. | |
| 2020/0396747 A1* | 12/2020 | Lee | H04W 72/08 |
| 2020/0403737 A1* | 12/2020 | Yeo | H04W 52/146 |
| 2021/0050950 A1* | 2/2021 | Zhou | H04W 72/0413 |
| 2021/0219329 A1* | 7/2021 | Zhou | H04L 1/08 |
| 2021/0250960 A1* | 8/2021 | Yang | H04W 52/281 |
| 2021/0400681 A1* | 12/2021 | Wang | H04L 5/0053 |
| 2022/0109551 A1* | 4/2022 | Bai | H04L 5/14 |
| 2022/0256470 A1* | 8/2022 | Zhang | H04W 52/367 |
| 2022/0377761 A1* | 11/2022 | Lee | H04W 72/1242 |

* cited by examiner

TRANSMIT POWER ADJUSTMENT FOR FULL DUPLEX FEEDBACK

FIELD OF TECHNOLOGY

The following relates to wireless communications, including transmit power adjustment for full duplex feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support sidelink communications between one or more wireless devices (e.g., UEs). In some examples, UEs communicating via sidelink may utilize a feedback channel (e.g., physical sidelink feedback channel (PSFCH)) to either transmit or receive feedback messages. A UE may operate according to a full duplex mode (e.g., UEs may be able to transmit and receive feedback messages concurrently), which may result in interference on the feedback channel.

SUMMARY

The described techniques relate to improved methods, systems, devices, and apparatuses that support transmit power adjustment for full duplex feedback. Generally, the described techniques provide for a UE operating in full duplex mode to adjust a transmit power for transmitting a feedback message based on one or more parameters. For example, a UE may receive a data message from a first UE and transmit a data message to a second UE. In such case, the UE may expect to transmit a feedback message indicating a decoding outcome of the first data message and receive a feedback message indicating a decoding outcome of the second data message during the same time period (e.g., same time resource) of a feedback channel (e.g., a physical sidelink feedback channel (PSFCH)). In some examples, the UE may determine one or more parameters related to the feedback messages and determine to adjust the transmit power for transmitting the feedback message based on the one or more parameters. The one or more parameters may include a priority associated with the data messages corresponding to the feedback messages, an amount of overlap or separation between the feedback resources, an amount of interference associated with the feedback resources, or a capability of the UE. In some examples, if the one or more parameters satisfy a condition (e.g., a threshold), the UE may determine to reduce the transmit power for transmitting a feedback message to the first UE. By adjusting the transmit power for feedback messages based on the one or more parameters, the UE may efficiently utilize feedback resources of the feedback channel while reducing self-interference.

A method for wireless communication at a UE is described. The method may include transmitting a first data message, where the first data message corresponds to a first feedback resource for receiving a first feedback message responsive to the first data message, receiving a second data message, where the second data message corresponds to a second feedback resource for transmitting a second feedback message responsive to the second data message, and where the second feedback resource at least partially overlaps in a time domain with the first feedback resource, adapting a transmit power for the second feedback message based on a priority of the first data message and a priority of the second data message, and transmitting the second feedback message with the transmit power in the second feedback resource while receiving the first feedback message in the first feedback resource according to a full duplex communication mode.

An apparatus for wireless communication at a UE is described. The apparatus may include a processor, memory in electronic communication with the processor, and instructions stored in the memory. The instructions may be executable by the processor to cause the apparatus to transmit a first data message, where the first data message corresponds to a first feedback resource for receiving a first feedback message responsive to the first data message, receive a second data message, where the second data message corresponds to a second feedback resource for transmitting a second feedback message responsive to the second data message, and where the second feedback resource at least partially overlaps in a time domain with the first feedback resource, adapt a transmit power for the second feedback message based on a priority of the first data message and a priority of the second data message, and transmit the second feedback message with the transmit power in the second feedback resource while receiving the first feedback message in the first feedback resource according to a full duplex communication mode.

Another apparatus for wireless communication at a UE is described. The apparatus may include means for transmitting a first data message, where the first data message corresponds to a first feedback resource for receiving a first feedback message responsive to the first data message, means for receiving a second data message, where the second data message corresponds to a second feedback resource for transmitting a second feedback message responsive to the second data message, and where the second feedback resource at least partially overlaps in a time domain with the first feedback resource, means for adapting a transmit power for the second feedback message based on a priority of the first data message and a priority of the second data message, and means for transmitting the second feedback message with the transmit power in the second feedback resource while receiving the first feedback message in the first feedback resource according to a full duplex communication mode.

A non-transitory computer-readable medium storing code for wireless communication at a UE is described. The code may include instructions executable by a processor to transmit a first data message, where the first data message corresponds to a first feedback resource for receiving a first feedback message responsive to the first data message, receive a second data message, where the second data message corresponds to a second feedback resource for transmitting a second feedback message responsive to the second data message, and where the second feedback resource at least partially overlaps in a time domain with the first feedback resource, adapt a transmit power for the second feedback message based on a priority of the first data message and a priority of the second data message, and transmit the second feedback message with the transmit power in the second feedback resource while receiving the first feedback message in the first feedback resource according to a full duplex communication mode.

Some examples of the method, apparatuses, and non-transitory computer-readable medium described herein may further include operations, features, means, or instructions for determining the priority of the second data message may be lower than the priority of the first data message, where adapting the transmit power for the second feedback messages includes decreasing the transmit power for the second feedback message.

Some examples of the method, apparatuses, and non-transitory computer-readable medium described herein may further include operations, features, means, or instructions for receiving a control message indicating a configuration for adapting the transmit power of the second feedback message.

In some examples of the method, apparatuses, and non-transitory computer-readable medium described herein, the configuration includes one or more tables of transmit power values for adapting the transmit power for the second feedback message, and the transmit power values may be based on an amount of frequency separation between the first feedback resource and the second feedback resource, an amount of frequency overlap between the first feedback resource and the second feedback resource, an amount of interference associated with the first feedback resource, an amount of interference associated with the second feedback resource, a self-interference cancellation capability of the UE, or a combination thereof.

In some examples of the method, apparatuses, and non-transitory computer-readable medium described herein, adapting the transmit power may include operations, features, means, or instructions for adapting the transmit power for the second feedback message based on an amount of frequency separation between the first feedback resource and the second feedback resource.

Some examples of the method, apparatuses, and non-transitory computer-readable medium described herein may further include operations, features, means, or instructions for determining the amount frequency separation between the first feedback resource and the second feedback resource may be below a threshold, where adapting the transmit power for the second feedback message includes decreasing the transmit power for the second feedback message.

In some examples of the method, apparatuses, and non-transitory computer-readable medium described herein, adapting the transmit power may include operations, features, means, or instructions for adapting the transmit power for the second feedback message based on an amount of frequency overlap between the first feedback resource and the second feedback resource.

Some examples of the method, apparatuses, and non-transitory computer-readable medium described herein may further include operations, features, means, or instructions for determining the amount of frequency overlap between the first feedback resource and the second feedback resource may be above a threshold, where adapting the transmit power for the second feedback message includes decreasing the transmit power for the second feedback message.

Some examples of the method, apparatuses, and non-transitory computer-readable medium described herein may further include operations, features, means, or instructions for calculating a first interference for a first subset of frequency resources of a feedback channel corresponding to the first feedback resource and calculating a second interference for a second subset of frequency resources of the feedback channel corresponding to the second feedback resource, where adapting the transmit power for the second feedback message may be based on the first interference and the second interference.

In some examples of the method, apparatuses, and non-transitory computer-readable medium described herein, calculating the first interference and the second interference may include operations, features, means, or instructions for calculating a received signal strength indicator (RSSI) associated with the first subset of frequency resources and the second subset of frequency resources, or a reference signal received power (RSRP) associated with the first subset of frequency resources and the second subset of frequency resources, or both.

Some examples of the method, apparatuses, and non-transitory computer-readable medium described herein may further include operations, features, means, or instructions for determining the RSSI, or the RSRP, or both may be above a threshold, where adapting the transmit power for the second feedback message includes decreasing the transmit power for the second feedback message.

In some examples of the method, apparatuses, and non-transitory computer-readable medium described herein, adapting the transmit power may include operations, features, means, or instructions for adapting the transmit power for the second feedback message based on a capability of the UE.

In some examples of the method, apparatuses, and non-transitory computer-readable medium described herein, the capability of the UE includes a self-interference cancellation capability.

Some examples of the method, apparatuses, and non-transitory computer-readable medium described herein may further include operations, features, means, or instructions for receiving a transmit power negotiation message from one or more other UEs, where the transmit power negotiation message indicates a set of transmit power parameters, where adapting the transmit power of the second feedback message may be based on the set of transmit power parameters.

In some examples of the method, apparatuses, and non-transitory computer-readable medium described herein, the set of transmit power parameters includes a capability of the UE, a probability associated with communicating via the first feedback resource and the second feedback resource, a distance between the UE and the one or more other UEs, or a combination thereof.

DETAILED DESCRIPTION

Figure 1:
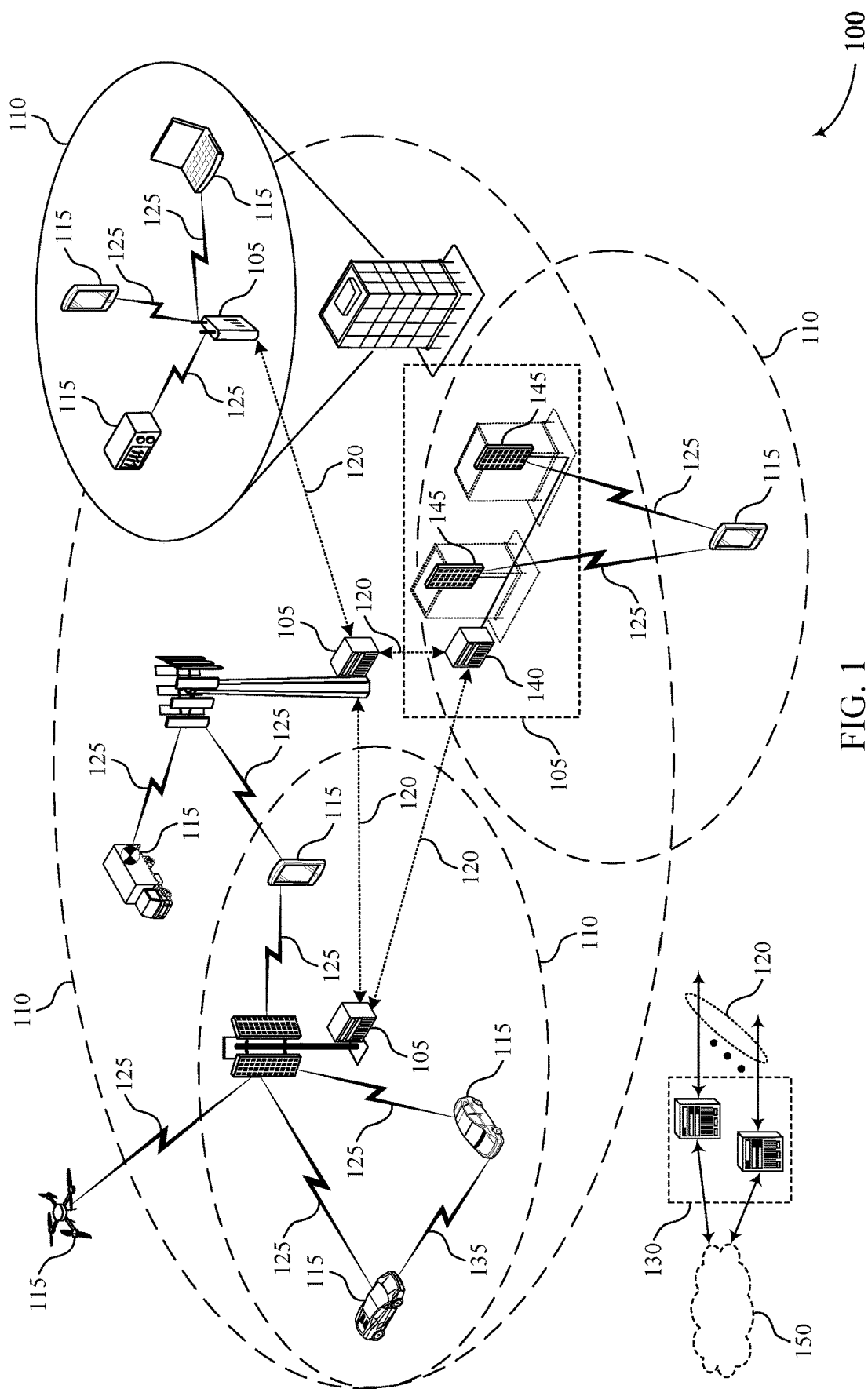
FIGS. 1 and 2 illustrate examples of wireless communications systems that support transmit power adjustment for full duplex feedback in accordance with aspects of the present disclosure.

Some wireless communications systems may support sidelink communication between two or more user equipment (UEs). In some examples, a UE may utilize a physical sidelink feedback channel (PSFCH) to transmit or receive feedback messages from one or more UEs. The PSFCH may span approximately two symbol periods in some examples, although other durations for the PSFCH are possible as well. UEs may determine PSFCH resources on which to transmit or receive feedback messages based on the subchannel used to transmit a data message (e.g., subchannel ID) and an ID of a transmitting UE (e.g., a UE transmitting the data message). A UE may determine a resource of the PSFCH for either receiving or transmitting a feedback message. However, in some cases, the UE may operate according to a full-duplex configuration. In a full-duplex configuration, the UE may receive and transmit feedback messages concurrently (e.g., on the same time resource of the PSFCH). In some examples, the UE may receive and transmit feedback messages concurrently and on partially or fully overlapping frequency resources. For example, a first UE may receive a first feedback message from a second UE corresponding to a data message transmitted to the second UE in a previous time slot and transmit a second feedback message to a third UE corresponding to a data message received from the third UE in a previous time slot. If a UE is to transmit a feedback message on the same time resource of the PSFCH as the one used to receive a feedback message, the UE may look at a priority associated with the data message corresponding to each feedback message and determine to either transmit or receive the feedback message with the highest priority. As such, a full-duplex UE, using such PSFCH resource allocation methods, may fail to receive or transmit feedback messages, thereby reducing the performance and efficiency of a wireless communications system. In addition, even if the UE may receive or transmit feedback messages on the same time resource of the PSFCH, the UE may be unable to adequately allocate transmission power for feedback messages to avoid self-interference.

Using the techniques disclosed herein, if a full-duplex UE transmits a first feedback message and receives a second feedback message in the same time period, then the UE may adjust the transmission power of the first feedback message based on one or more parameters such as the priorities of the original messages that triggered the feedback messages, the amount of frequency overlap between the feedback resources, an interference level for each of the feedback resources, a self-interference capability of the UE, or some combination of these factors or the like. The amount in which the UE adjusts the transmit power may be preconfigured. For example, the first UE may be preconfigured with a lookup table of transmit power adjustment values, where each transmit power adjustment value is associated with a specific situation (e.g., different values of the one or more transmit power allocation parameters). Alternatively or additionally, the first UE may determine which power allocation parameters and/or lookup table to use to adjust the transmit power based on negotiations with the second UE and the third UE. In either case, the first UE may transmit the feedback message corresponding to the first data message to the second UE while receiving the feedback message corresponding to the second data message to the third UE. As such, a full-duplex UE may receive and transmit feedback messages concurrently on the PSFCH while taking into account transmit power allocation thereby increasing reliability and decreasing self-interference.

Aspects of the disclosure are initially described in the context of wireless communications systems. Additional aspects are described in the context of process flows. Aspects of the disclosure are further illustrated by and described with reference to apparatus diagrams, system diagrams, and flowcharts that relate to transmit power adjustment for full duplex feedback.

FIG. 1 illustrates an example of a wireless communications system 100 that supports transmit power adjustment for full duplex feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the UE 115 may operate according to a full duplex configuration and adjust a transmit power for transmitting a feedback message based on one or more parameters. For example, the UE 115 may receive a data message from a first UE and transmit a data message to a second UE. In such case, the UE 115 may expect to transmit a feedback message and receive a feedback message during the same time period (e.g., same time resource) of a feedback channel. In some examples, the UE 115 may determine one or more parameters related to the feedback messages and determine to adjust the transmit power for transmitting the feedback message based on the one or more parameters. The one or more parameters may include a priority associated with the data messages corresponding to the feedback messages, an amount of overlap or separation between feedback resources, an amount of interference associated with the feedback resources, or a capability of the UE 115. In some examples, if the one or more parameters satisfy a condition (e.g., threshold), the UE 115 may determine to reduce the transmit power for transmitting a feedback message to the second UE by an amount (e.g., a configured amount). By adjusting the transmit power for feedback messages based on the one or more parameters, the UE 115 may efficiently utilize feedback resources of the feedback channel while reducing self-interference.

Figure 2:
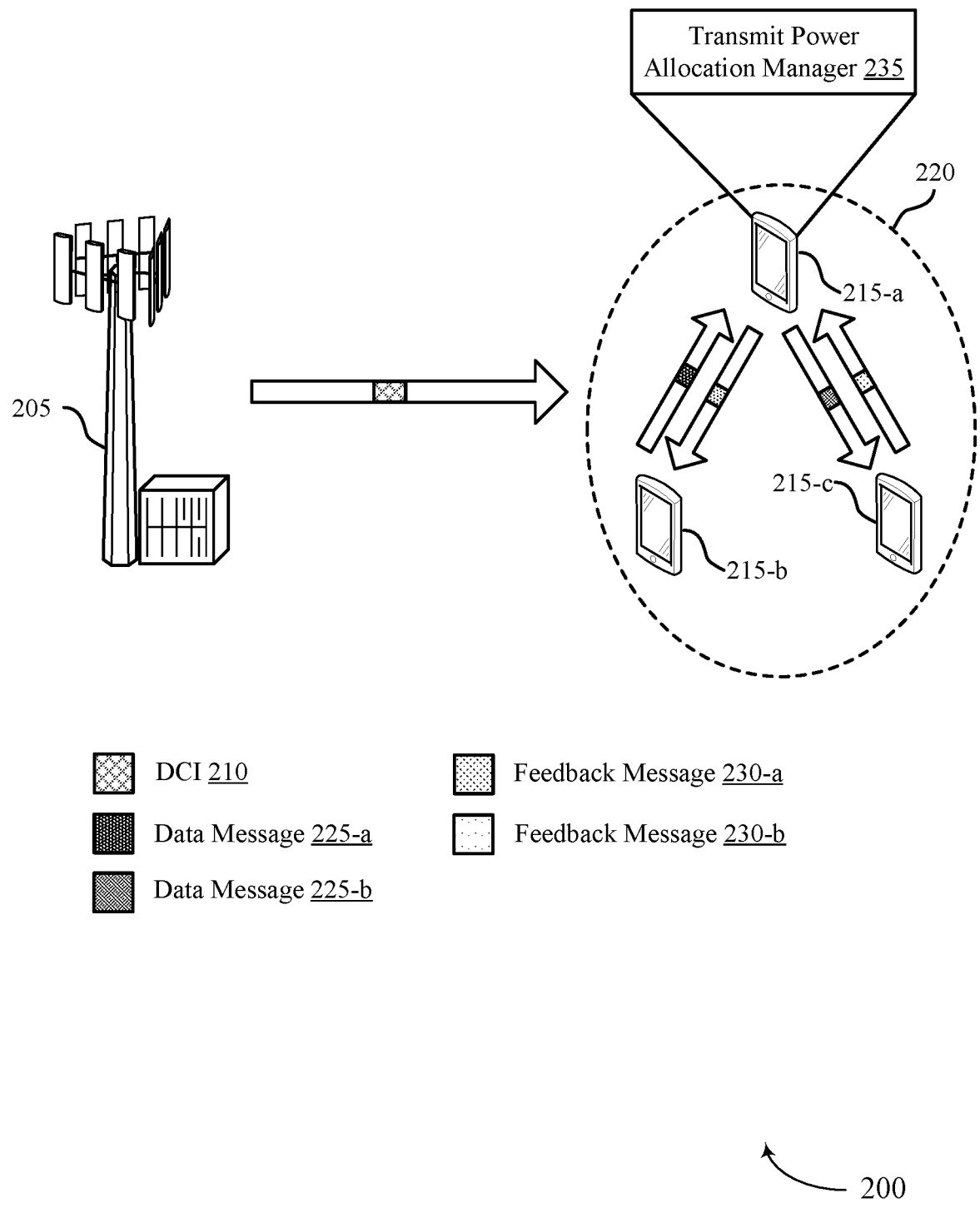

FIG. 2 illustrates an example of a wireless communications system 200 that supports transmit power adjustment for full duplex feedback in accordance with aspects of the present disclosure. In some examples, the wireless communications system 200 may implement aspects of a wireless communications system 100. For example, the wireless communications system 200 may include a base station 205 and a UE 215 (e.g., a UE 215-a, a UE 215-b, and a UE 215-c) which may be examples of a base station 105 and a UE 115 with reference to FIG. 1.

In some examples, the wireless communications system 200 may support sidelink communications. That is, communication between two or more wireless devices (e.g., UEs 215). To support sidelink communications, a base station 205 may transmit downlink control information (DCI) 210 over a physical downlink control channel (PDCCH) to the group of UEs 215 (e.g., UE 215-a, UE 215-b, and UE 215-c). The DCI 210 may allocate resources (e.g., time and frequency resources) to the group of UEs 215 for sidelink communications. In some examples, the UE 215-a, the UE 215-b, and the UE 215-c may reserve sets of the allocated resources for sidelink communication and indicate the reserved set of resources as well as other control information by transmitting sidelink control information (SCI) to one another. For example, the UE 215-a may reserve a set of resources for transmitting a message to the UE 215-b and transmit SCI indicating the set of reserved resources. the UE 215-b may receive the SCI and utilize the SCI to demodulate and receive the message from the UE 215-a.

In some examples, the UEs 215 may transmit feedback (e.g., hybrid automatic repeat request (HARQ) feedback) to one another indicating whether a message was received and decoded successfully (e.g., acknowledgement (ACK) feedback) or unsuccessfully (e.g., negative acknowledgement (NACK) feedback). In such case, the UEs 215 may be configured with a PSFCH for transmitting and receiving feedback messages from other UEs. The UEs 215 may select resources of the PSFCH for transmitting or receiving feedback messages based on an identifier associated with a subchannel used to transmit a data message in a prior time period such as a prior slot (e.g., subchannel ID) and an identifier associated with a transmitting UE 215 (e.g., UE transmitter ID). The PSFCH may be organized such that a first subset of resources (e.g., resource blocks) of the PSFCH may be associated with odd numbered transmission UEs and a second subset of resources of the PSFCH may be associated with even numbered UEs. The first subset of resources and the second subset of resources may be further divided by subchannel. As such, each of the UEs 215 may select a set of unique resources for transmitting or receiving feedback messages based on the ID of the transmitting UE 215 and the subchannel used to transmit a data message in a prior slot.

In some examples, the wireless communications system 200 may support UEs 215 operating in full-duplex mode. Using full-duplex mode, the UEs 215 may receive and transmit messages concurrently (e.g., on the same time resource). For example, the UE 215-*a* may receive a data message 225-*a* from the UE 215-*b* and transmit a data message 225-*b* to UE 215-*c*. As such, the UE 215-*a* may expect to transmit a feedback message 230-*a* to UE 215-*b* and expect to receive a feedback message 230-*b* from UE 215-*c* over the PSFCH (e.g., during the same time resource). However, using other techniques, the UE 215-*a* may be unable to select PSFCH resources (e.g., resource block) for transmitting the feedback message 230-*a* as well as PSFCH resources (e.g., resource block) for receiving the feedback message 230-*b*. Instead, using other techniques, the UE 215-*a* may drop the feedback message 230 associated with the data message 225 with a lower priority. Such techniques may allow the UE 215-*a* to avoid possible interference caused by utilizing adjacent or overlapping PSFCH resources, but may unnecessarily restrict a full-duplex UE in terms of receiving and transmitting feedback messages when interference may be avoided.

According to techniques of the current disclosure, a UE 215 operating in full-duplex mode may adjust a transmit power associated with transmitting a feedback message based on one or more parameters. For example, the UE 215-*a* may operate according to full-duplex mode and receive a data message 225-*a* from UE 215-*a* and transmit a data message 225-*b* to UE 215-*b*. In one example, the UE 215-*a* may utilize a transmit power allocation manager 235 to adjust the transmit power for transmitting the feedback message 230-*a* (feedback message indicating a decoding outcome of data message 225-*a*) to the UE 215-*a* based on a priority associated with the data message 225-*a* and the data message 225-*b*. For example, the data message 225-*b* may be associated with a first priority and the data message 225-*a* may be associated with a second priority. If the first priority is greater than the second priority, the UE 215-*a* may reduce the transmit power for transmitting the feedback message 230-*a* by an amount. Examples of high priority communications may be ultra-reliable low-latency communication (URLLC).

Alternatively or additionally, the UE 215-*a* may utilize the transmit power allocation manager 235 to adjust the transmit power for transmitting the feedback message 230-*a* to the UE 215-*b* based on the amount of overlap between PSFCH resources. For example, the UE 215-*a* may select a first set of resources for transmitting a feedback message 230-*a* and a second set of resource for receiving feedback message 230-*b*. In some examples, the UE 215-*a* may calculate the amount of overlap between (e.g., frequency overlap) the first set of resources and the second set of resources. If the amount of overlap exceeds a threshold amount of overlap, the UE 215-*a* may reduce the transmit power for transmitting the feedback message 230-*a* by an amount (e.g., a preconfigured amount or an amount determined by the transmit power allocation manager 235).

Alternatively or additionally, the UE 215-*a* may utilize the transmit power allocation manager 235 to adjust the transmit power for transmitting the feedback message 230-*a* to the UE 215-*b* based on the amount of separation between PSFCH resources. For example, the UE 215-*a* may select a first set of resources for transmitting a feedback message 230-*a* and a second set of resource for receiving feedback message 230-*b*. In some examples, the UE 215-*a* may calculate the amount of separation between (e.g., frequency separation) the first set of resources and the second set of resources. If the amount of separation does not exceed a threshold amount of separation, the UE 215-*a* may reduce the transmit power for transmitting the feedback message 230-*a* by an amount (e.g., a preconfigured amount or an amount determined by the transmit power allocation manager 235).

Alternatively or additionally, the UE 215-*a* may utilize transmit power allocation manager 235 to adjust the transmit power for transmitting the feedback message 230-*a* to the UE 215-*b* based on an amount of interference, a capability of the UE 215-*a* to cancel interference, or both. For example, the UE 215-*a* may determine the amount of interference by calculating a reference signal received power (RSRP) value or a received signal strength indicator (RSSI) value of one or more signals received at the UE 215-*a* over a set of resources including at least the resources used for transmitting the feedback message 230-*a* and receiving the feedback message 230-*b*. In some examples, the UE 215-*a* may calculate interference over the full bandwidth of the PSFCH. In another example, the UE 215-*a* may calculate interference for a portion of the bandwidth of the PSFCH. If the amount of interference exceeds a threshold (e.g., an RSSI threshold or an RSRP threshold), the UE 215-*a* may reduce the transmit power for transmitting the feedback message 230-*a* by a first amount. Additionally, the UE 215-*b* may take into account the capability of the UE 215-*a* to cancel out interference when determining the amount by which to reduce the transmit power. For example, the UE 115-*a* may be a high-capability UE and may be able to cancel out some or all of the interference. Using this knowledge along with the calculated amount of interference, the UE 215-*a* may determine not to adjust the transmit power for transmitting the feedback message 230-*a* or reduce the transmit power for transmitting the feedback message 230-*a* by a second amount, where the second amount is less than the first amount.

In some examples, the amount by which the UE 215-*a* adjusts the transmit power for transmitting the feedback message 230-*b* may be configured at the UE 215-*a*. For example, the UE 215-*a* may receive a control message from the network (e.g., a base station) configuring the UE 215-*a* with a set of transmit power adjustment values for different scenarios. The different scenario may correspond to a combination of one or more of priority information related to the data messages 225, a threshold value for an amount of separation between sets of feedback resources, a threshold value for an amount of overlap between sets of feedback resources, a threshold value for an amount of interference, or information related to the capability of the UE 115-*a*. These various factors and thresholds may be captured in a table to represent the different scenarios, and this table may be configured or otherwise indicated to the UE 215-*a*. That is, the configured transmit power adjustment values may be a function of the different scenarios discussed above. The UE 215-*a* may determine which scenario fits its current situation and may adjust the transmit power for transmitting the feedback message 230-*a* based on the corresponding transmit power adjustment value (e.g., a corresponding transmit power value listed in a table that corresponds to a particular combination of factors).

In some examples, the wireless communications system 200 may support negotiations regarding transmit power adjustment between UEs 215. For example, before communicating with UE 215-*b* and UE 215-*c*, the UE 215-*a* may exchange information with the UE 215-*b* and the UE 215-*c* and determine a transmit power adjustment value for each of the feedback message 230-*a* and the feedback message 230-b. Examples of information the UE 215-a may utilize to determine the transmit power adjustment may be the self-interference cancellation capability of the UE 215-a, the probability that UE 215-a transmits/receives feedback messages 230 on the same resources (e.g., time and frequency resources of the PSFCH), and a distance between the UE 215-a and UE 215-b or UE 215-c. That is, the UE 215-a may determine, from the negotiation, a unique transmit power adjustment for feedback messages 230 (e.g., feedback message 230-a or feedback message 230-b) depending on the UE 215 (e.g., UE 215-b or UE 215-c) it is communicating with. Using the technique described herein, a UE 215 may adjust a transmit power for transmitting a feedback message while receiving a feedback message based on one or more parameters thereby reducing interference and efficiently utilizing feedback resources of the PSFCH.

Figure 3:
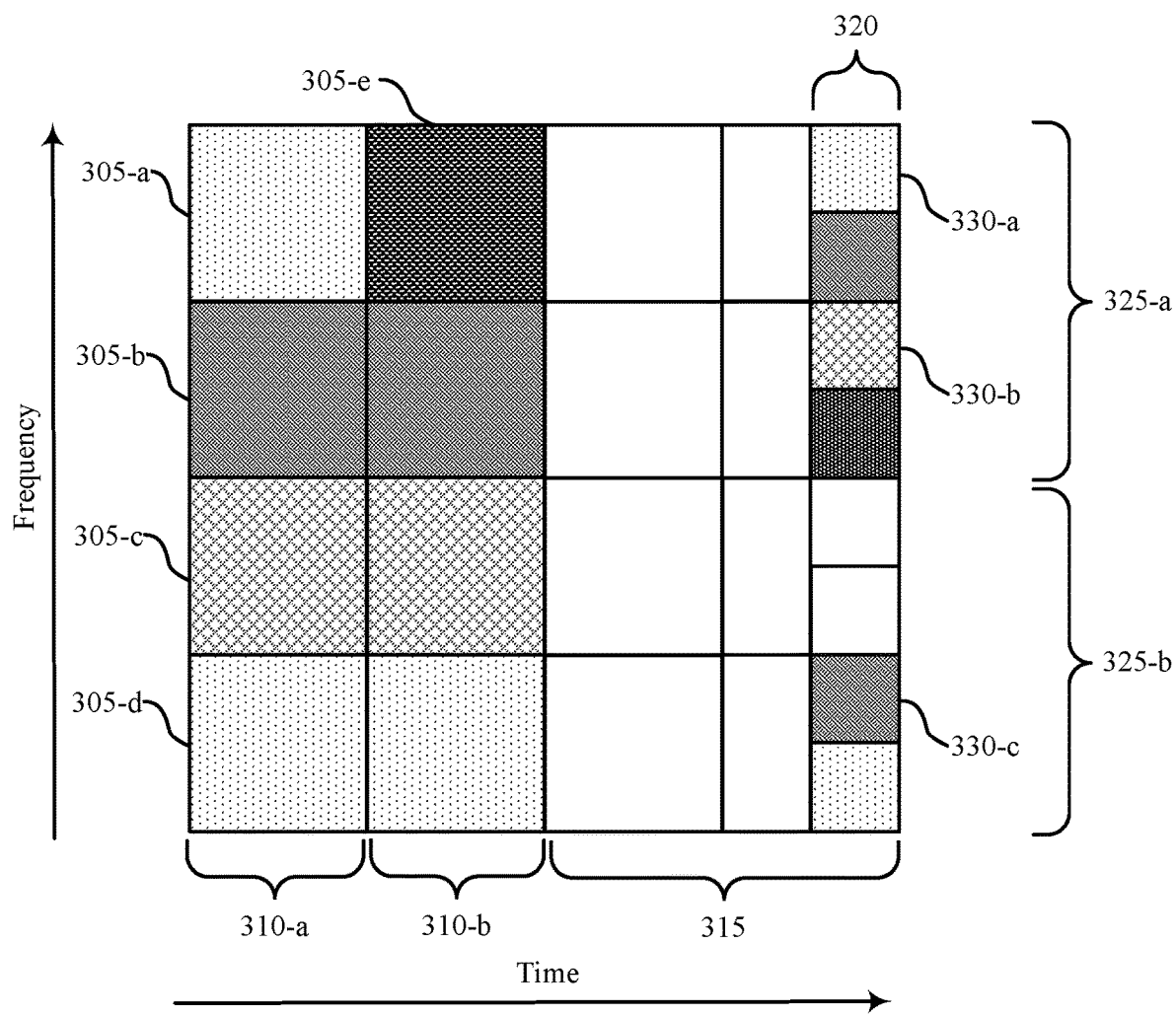
FIG. 3 illustrates an example of a physical sidelink feedback channel (PSFCH) format that supports transmit power adjustment for full duplex feedback in accordance with aspects of the present disclosure.

FIG. 3 illustrates an example of a PSFCH format 300 that supports transmit power adjustment for full duplex feedback in accordance with aspects of the present disclosure. In some examples, the PSFCH format 300 may be utilized by a UE which may be an example of a UE 115 or a UE 215 with reference to FIGS. 1 and 2 respectively.

In some examples, the resources allocated to a group of UEs for sidelink communications may be divided into multiple subchannels. For example, the resources allocated to the group of UEs may be divided into a subchannel 305-a, a subchannel 305-b, a subchannel 305-c, a subchannel 305-d, and a subchannel 305-e. Each subchannel 305 may span a different amount of frequency resources or the same amount of frequency resources. In addition, each subchannel may be located in the same slot 310 or different slots 310. For example, the subchannel 305-a and the subchannel 305-b may be located in the slot 310-a whereas the subchannel 305-e may be located in the slot 310-b.

UEs may utilize resources within a PSFCH 320 for transmitting and receiving feedback messages related to data messages received or transmitted in prior slots of a physical sidelink shared channel (PDSCH) (e.g., slot 310-a and slot 310-b). In some examples, the PSFCH 320 may be located after gap 315 (e.g., a system wide gap). As described with reference to FIG. 2, a UE may determine (or select) a set of resources (e.g., resource block) within the PSFCH 320 based on a subchannel ID and a transmitting UE ID. This mapping between the resources of the PSFCH 320 and the subchannels 305 may be configured or otherwise indicated to a UE. For example, a first UE may transmit a data message to a second UE over a set of resources located within subchannel 305-a in slot 310-a and the first UE may be associated with an odd numbered transmitting UE ID (e.g., 1, 3, 5, etc.). PSFCH region 325-a may represent a region of PSFCH resources which are reserved for odd-number transmitting UEs and PSFCH region 325-b may represent resources which are reserved for even-numbered transmitting UEs. The PSFCH regions 325 may further be divided by subchannel. For example, resource 330-a may correspond to subchannel 305-a. As such, the second UE may select resource 330-a for transmission of a feedback message to the first UE in response to the data message received from the first UE.

In some examples, a UE may operate in full-duplex mode and transmit/receive feedback messages concurrently (e.g., on the same time resources within PSFCH 320). For example, a first UE operating in full duplex mode may transmit a data message to a second UE and receive a data message from a third UE. As such, the first UE may select concurrent resources 330 within PSFCH 320.

In one example, the first UE may select resource 330-a for receiving a feedback message from the second UE and may select resource 330-a for transmitting a feedback message to the third UE based on the subchannel ID and the transmitting UE ID. In such example, the first UE may adjust the transmit power for transmitting the feedback message to the third UE based on an amount of overlap between the resources selected for transmission/reception of a feedback message exceeding a threshold. In this case, the amount of overlap is 100 percent and as a result, the first UE may reduce the transmit power by an amount. In some examples, the amount by which the transmit power is reduced may be calculated as function of the percentage of overlap. For example, as the percentage of overlap decreases, the amount for which the transmit power is reduced may also decrease.

Additionally or alternatively, the first UE may adjust the transmit power for transmitting the feedback message to the third UE based on an amount of interference and an interference cancellation capability of the first UE. For example, the first UE may calculate interference (e.g., RSRP value or RSSI value) over resource 330-a and if the interference exceeds a threshold (e.g., RSRP threshold or RSSI threshold), the first UE may reduce the transmit power for transmitting a feedback message to the third UE by a first amount. In addition, the first UE may further adjust the transmit power based on the capability of the UE to cancel out interference. In some examples, the first UE may be a high capability UE (e.g., the UE may be able to cancel out all or some of the interference) and as such, may choose not to reduce the transmit power by the first amount or may decrease the transmit power by an amount less than the first amount. Additionally or alternatively, the UE may adjust the transmit power based on a priority associated with the data message transmitted to the second UE and the data message received from the third UE. For example, if the priority of the data message received from the third UE is less than the priority of the data message sent to the second UE, the first UE may reduce the transmit power for transmitting the feedback message to the third UE by an amount.

In another example, the first UE may select a resource 330-b for receiving a feedback message from the second UE and may select resource 330-c for transmitting a feedback message to the third UE based on a subchannel ID and a transmitting UE ID. In such example, the first UE may adjust the transmit power for transmitting the feedback message to the third UE based on an amount of separation (e.g., frequency separation) between the resources selected for transmission/reception of a feedback message not exceeding a threshold. In this cases, the amount of separation may be three resources 330. In some cases, the threshold amount of separation may be four resources 330 and as such, the first UE may reduce the transmit power by an amount. In some examples, the amount may be calculated as function of the amount of separation. For example, as the amount of separation decreases, the amount for which the transmit power is reduced may increase.

Additionally or alternatively, the first UE may adjust the transmit power for transmitting the feedback message to the third UE based on an amount of interference and an interference cancellation capability of the first UE. For example, the first UE may calculate interference (e.g., RSRP value or RSSI value) over resources 330 which include resources 330-b and 330-c and if the interference exceeds a threshold, the first UE may reduce the transmit power for transmitting a feedback message to the third UE by an amount. In some examples, the first UE may be a high capability UE (e.g., the UE may be able to cancel out all or some of the interference)

and as such, may choose not to reduce the transmit power by the first amount or may decrease the transmit power by an amount less than the first amount. Additionally or alternatively, the UE may adjust the transmit power based on a priority associated with the data message transmitted to the second UE and the data message received from the third UE. For example, if the priority of the data message received from the third UE is less than the priority of the data message sent to the second UE, the first UE may reduce the transmit power for transmitting the feedback message to the third UE by an amount.

In some examples, the full-duplex UE may be configured with a set transmit adjustment values which specify the amount to adjust the transmit power, where each transmit power adjustment value may correspond to a different scenario. Each scenario may correspond to one or more of a priority of data messages associated with concurrent transmission/reception of feedback messages, an amount of separation between feedback resources, a self-interference capability of the full-duplex UE, or an amount of interference associated with the feedback resources. In some examples, the set of transmit power adjustment values may be indicated to the UE in the form of a lookup table. The UE may assess its current situation, identify a transmit power adjustment value from the lookup table, and adjust its transmit power for transmitting a feedback message based on the identified transmit power adjustment value.

Figure 4:
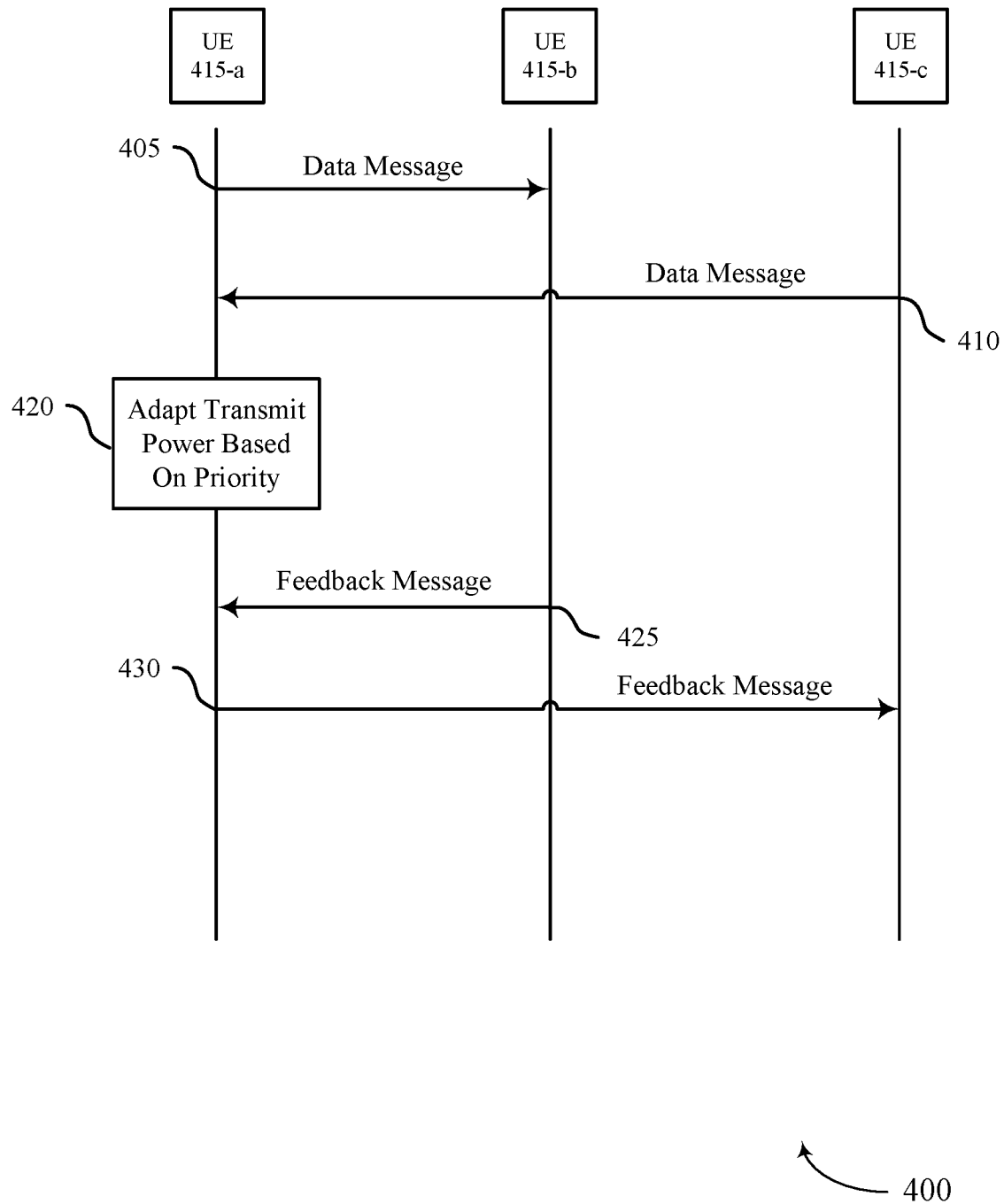
FIGS. 4 and 5 illustrate examples of process flows that support transmit power adjustment for full duplex feedback in accordance with aspects of the present disclosure.

FIG. 4 illustrates an example of a process flow 400 that supports transmit power adjustment for full duplex feedback in accordance with aspects of the present disclosure. In some examples, the process flow 400 may implement aspects of a wireless communications system 100, a wireless communications system 200, or a PSFCH format 300. For example, the process flow 400 may include UEs 415 (e.g., a UE 415-a, a UE 415-b, and a UE 415-c) which may be examples of a UE 115 or a UE 215 with reference to FIGS. 1 and 2. The process flow 400 may involve a UE 415-a operating in full-duplex mode adjusting a transmit power for a transmitting a feedback message. Alternative examples of the following may be implemented, where some steps are performed in a different order than described or are not performed at all. In some cases, steps may include additional features not mentioned below, or further steps may be added.

At 405, the UE 415-a may transmit a data message to UE 415-b. In addition, at 410, the UE 415-a may receive a data message at 410 from UE 415-c. In some examples, the UE 415-a may operate in full-duplex mode and may receive and transmit messages concurrently. That is, the UE 415-a may transmit the data message at 405 during the same time period as receiving the data message at 410.

At 420, the UE 415-a may adapt the transmit power for transmitting a feedback message corresponding to the data message received at 410. In some examples, the UE 415-a may adapt the transmit power based on a priority of the data message received at 410 and a priority of the data message transmitted at 405. For example, the UE 415-a may determine the priority of the data message received at 410 is less than the priority of the data message transmitted at 405. Based on this determination, the UE 415-a may determine to reduce the transmit power for transmitting a feedback message corresponding to the data message received at 410.

Alternatively or additionally, the UE 415-a may adjust the transmit power for transmitting a feedback message corresponding to the data message received at 410 based on an amount of separation or overlap associated with feedback resources for transmitting/receiving feedback messages. For example, the UE 415-a may determine a feedback resource for transmitting a feedback message and a feedback resource for receiving a feedback message may overlap or may be separated by an amount. If the amount satisfies a threshold, the UE 415-a may reduce the transmit power for transmitting a feedback message corresponding to the data message received at 410.

Alternatively or additionally, the UE 415-a may adjust the transmit power for transmitting a feedback message corresponding to the data message received at 410 based on a capability of the UE 415-a, an amount of interference over feedback resources, or both. For example, the UE 415-a may determine an amount interference associated with a feedback resource for transmitting a feedback message and a feedback resource for receiving a feedback message. If the amount of interference exceeds a threshold, the UE 415-a may determine to reduce the transmit power for transmitting a feedback message corresponding to the data message received at 410. In another example, the UE 415-a may also determine its capability to cancel interference. For example, the UE 415-a may be a high capability UE and as such may be able to cancel some or all of the interference. In such example, the UE 415-a may take into account both the amount of interference and its capability to cancel the interference when determining the amount in which to adjust the transmit power for transmitting a feedback message corresponding to the data message received at 410. According to the current disclosure, one or more of the methods (e.g., priority of data messages, spatial characteristics of feedback resources, UE capability, or interference) may be used for transmit power adjustment.

At 425, the UE 415-a may receive a feedback message corresponding to the data message transmitted at 405. In some examples, the feedback message may be a HARQ message. If the UE 415-b did not receive and decode the data message at 405, the feedback message may include NACK feedback. If the UE 415-b did receive and decode the data message at 405, the feedback message may include ACK feedback.

At 430, the UE 415-a may transmit a feedback message corresponding to the data message received at 410 according to the adjusted transmit power. In some examples, the feedback message may be a HARQ message. If the UE 415-a did not receive and decode the data message at 410, the feedback message may include NACK feedback. If the UE 415-a did receive and decode the data message at 410, the feedback message may include ACK feedback. In some examples, the UE 415-a may transmit the feedback message during the same period of time as the UE 415-a receives the feedback message at 425.

Figure 5:
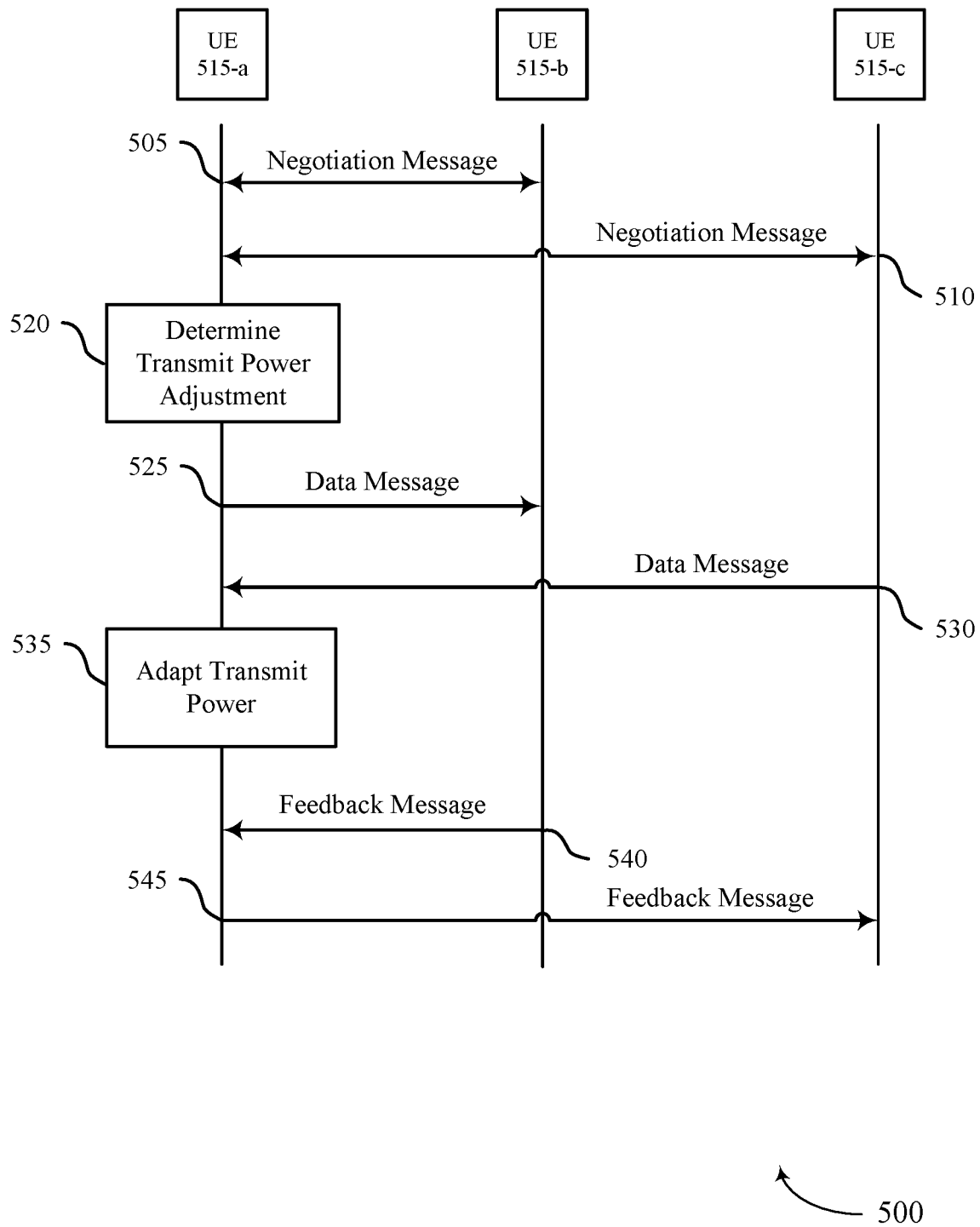

FIG. 5 illustrates an example of a process flow 500 that supports transmit power adjustment for full duplex feedback in accordance with aspects of the present disclosure. In some examples, the process flow 500 may implement aspects of a wireless communications system 100, a wireless communications system 200, a PSFCH format 300, or a process flow 400. For example, the process flow 500 may include a UEs 515 (e.g., a UE 515-a, a UE 515-b, and a UE 515-c) which may be examples of a UE 115, a UE 215, or a UE 415 with reference to FIGS. 1, 2, and 4. The process flow 500 may involve a UE 515-a operating in full-duplex mode adjusting a transmit power for a transmitting a feedback message. Alternative examples of the following may be implemented, where some steps are performed in a different order than described or are not performed at all. In some cases, steps may include additional features not mentioned below, or further steps may be added.

At 505, the UE 515-a may negotiate with the UE 515-b regarding transmit power adjustment for feedback messages. During the negotiation, the UE 515-a may gain information such as the probability that the UE 515-a may transmit/receive feedback from the UE 515-b on the same feedback resources (e.g., partially overlapping resources) and a distance between the UE 515-a and the UE 515-b. At 510, the UE 515-a may negotiate with the UE 515-c regarding transmit power adaptation for feedback messages. During the negotiation, the UE 515-c may gain information such as the probability that the UE 515-a may transmit/receive feedback from the UE 515-c on the same feedback resources and a distance between the UE 515-a and the UE 515-c. In some examples, negotiations between the UE 515-a and other UEs (e.g., UE 515-b and UE 515-c) may occur prior to transmission of data messages to the other UEs. In another example, negotiations between the UE 515-a and other UEs may occur after the transmission of a data messages to the other UEs, but prior to transmission of feedback messages related to the data messages.

At 520, the UE 515-a may determine one or more transmit power adjustment values based on the negotiations that may take place at 505 and 510. That is, UE 515-a may determine an amount for which to adjust a transmit power for transmitting a feedback based on one or more of a capability of the UE 515-a, a probability of transmitting/receiving feedback message from other UEs (e.g., the UE 515-b or the UE 515-c) using the same feedback resources, or a distance between the UE 515-a and other UEs (e.g., the UE 515-b or the UE 515-c). In some examples, the transmit power adjustment values may be UE-specific. For example, the UE 515-a may determine a first transmit power adjustment value for transmitting feedback messages to the UE 515-b and a second transmit power adjustment value for transmitting feedback messages to the UE 515-c.

At 525, the UE 515-a may transmit a data message to UE 515-b. In addition, the UE 515-a may receive a data message at 530 from UE 515-c. In some examples, the UE 515-a may operate in full-duplex mode and may transmit the data message at 525 during the same time period as receiving the data message at 530.

At 535, the UE 515-a may adjust the transmit power for transmitting a feedback message corresponding to the data message received at 530. In some examples, the UE 515-a may adjust the transmit power based on the one or more transmit power adjustment values determined at 520.

At 540, the UE 515-a may receive a feedback message corresponding to the data message transmitted at 525. In addition, at 545, the UE 515-a may transmit a feedback message corresponding to the data message received at 530 according to the adjusted transmit power. In some examples, the UE 515-a may receive the feedback message at 540 during the same period of time the UE 515-a may transmit the feedback message at 545.

Figure 6:
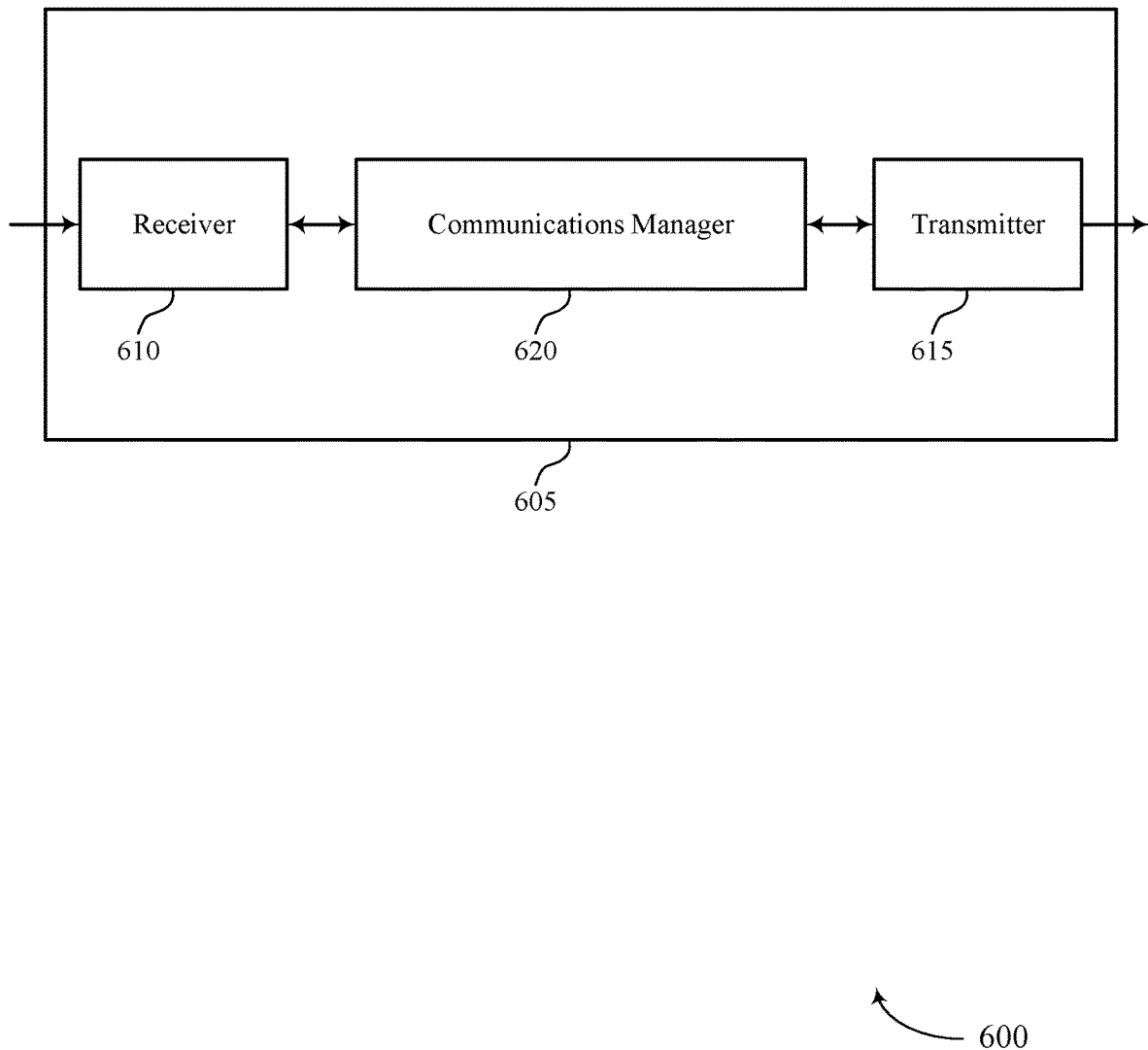
FIGS. 6 and 7 show block diagrams of devices that support transmit power adjustment for full duplex feedback in accordance with aspects of the present disclosure.

FIG. 6 shows a block diagram 600 of a device 605 that supports transmit power adjustment for full duplex feedback in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to transmit power adjustment for full duplex feedback). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to transmit power adjustment for full duplex feedback). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of transmit power adjustment for full duplex feedback as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for transmitting a first data message, where the first data message corresponds to a first feedback resource for receiving a first feedback message responsive to the first data message. The communications manager 620 may be configured as or otherwise support a means for receiving a second data message, where the second data message corresponds to a second feedback resource for transmitting a second feedback message responsive to the second data message, where the second feedback resource at least partially overlaps in a time domain with the first feedback resource. The communications manager 620 may be configured as or otherwise support a means for adapting a transmit power for the second feedback message based on a priority of the first data message and a priority of the second data message. The communications manager 620 may be configured as or otherwise support a means for transmitting the second feedback message with the transmit power in the second feedback resource while receiving the first feedback message in the first feedback resource according to a full duplex communication mode.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources. For example, by adjusting a transmit power of a feedback message based on one or more parameters or based on negotiations between other devices 605, the device 605 may transmit and receive feedback messages on the PSFCH as opposed to dropping one of the feedback messages.

Figure 7:
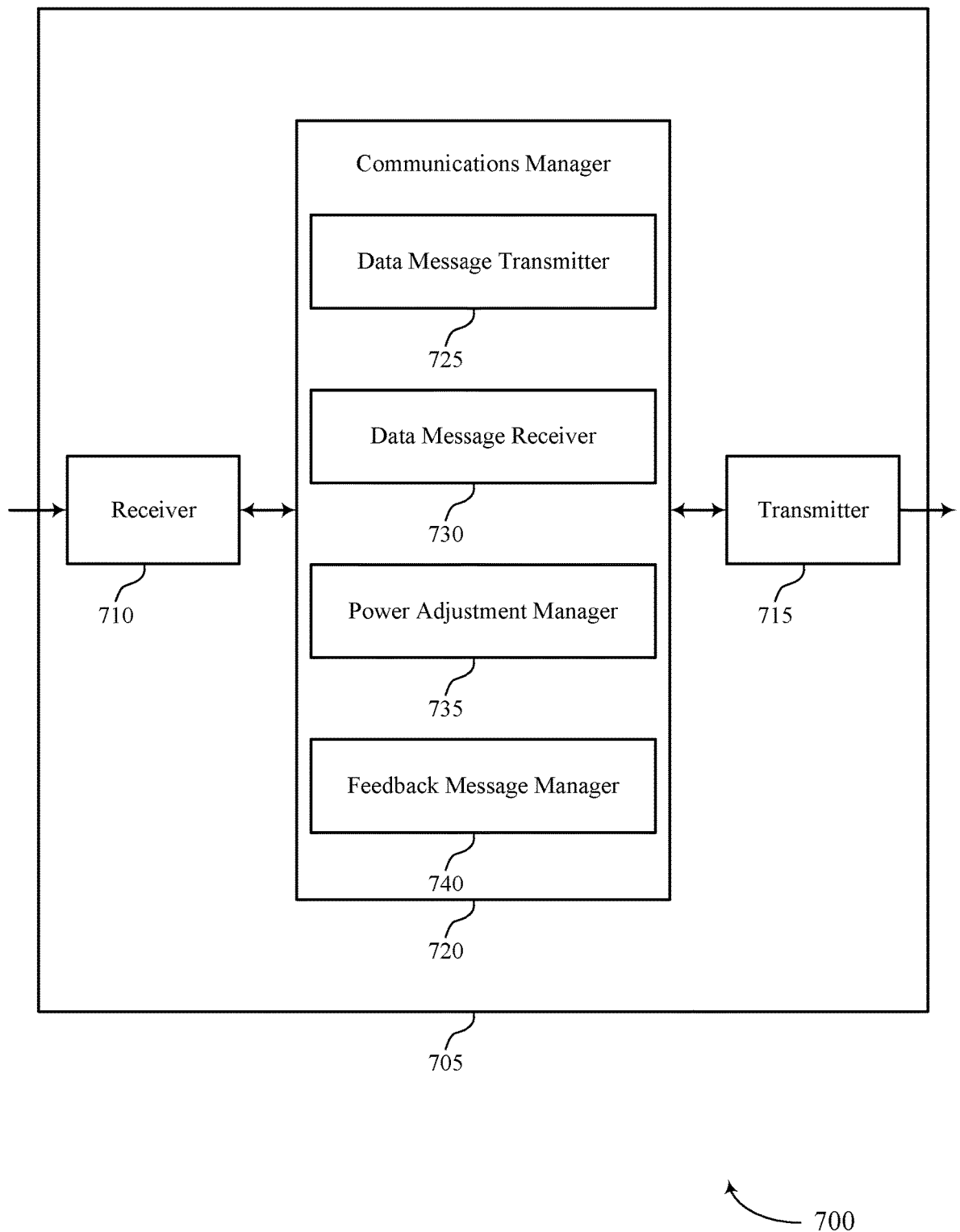

FIG. 7 shows a block diagram 700 of a device 705 that supports transmit power adjustment for full duplex feedback in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to transmit power adjustment for full duplex feedback). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to transmit power adjustment for full duplex feedback). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of transmit power adjustment for full duplex feedback as described herein. For example, the communications manager 720 may include a data message transmitter 725, a data message receiver 730, a power adjustment manager 735, a feedback message manager 740, or any combination thereof.

The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The data message transmitter 725 may be configured as or otherwise support a means for transmitting a first data message, where the first data message corresponds to a first feedback resource for receiving a first feedback message responsive to the first data message. The data message receiver 730 may be configured as or otherwise support a means for receiving a second data message, where the second data message corresponds to a second feedback resource for transmitting a second feedback message responsive to the second data message, where the second feedback resource at least partially overlaps in a time domain with the first feedback resource. The power adjustment manager 735 may be configured as or otherwise support a means for adapting a transmit power for the second feedback message based on a priority of the first data message and a priority of the second data message. The feedback message manager 740 may be configured as or otherwise support a means for transmitting the second feedback message with the transmit power in the second feedback resource while receiving the first feedback message in the first feedback resource according to a full duplex communication mode.

Figure 8:
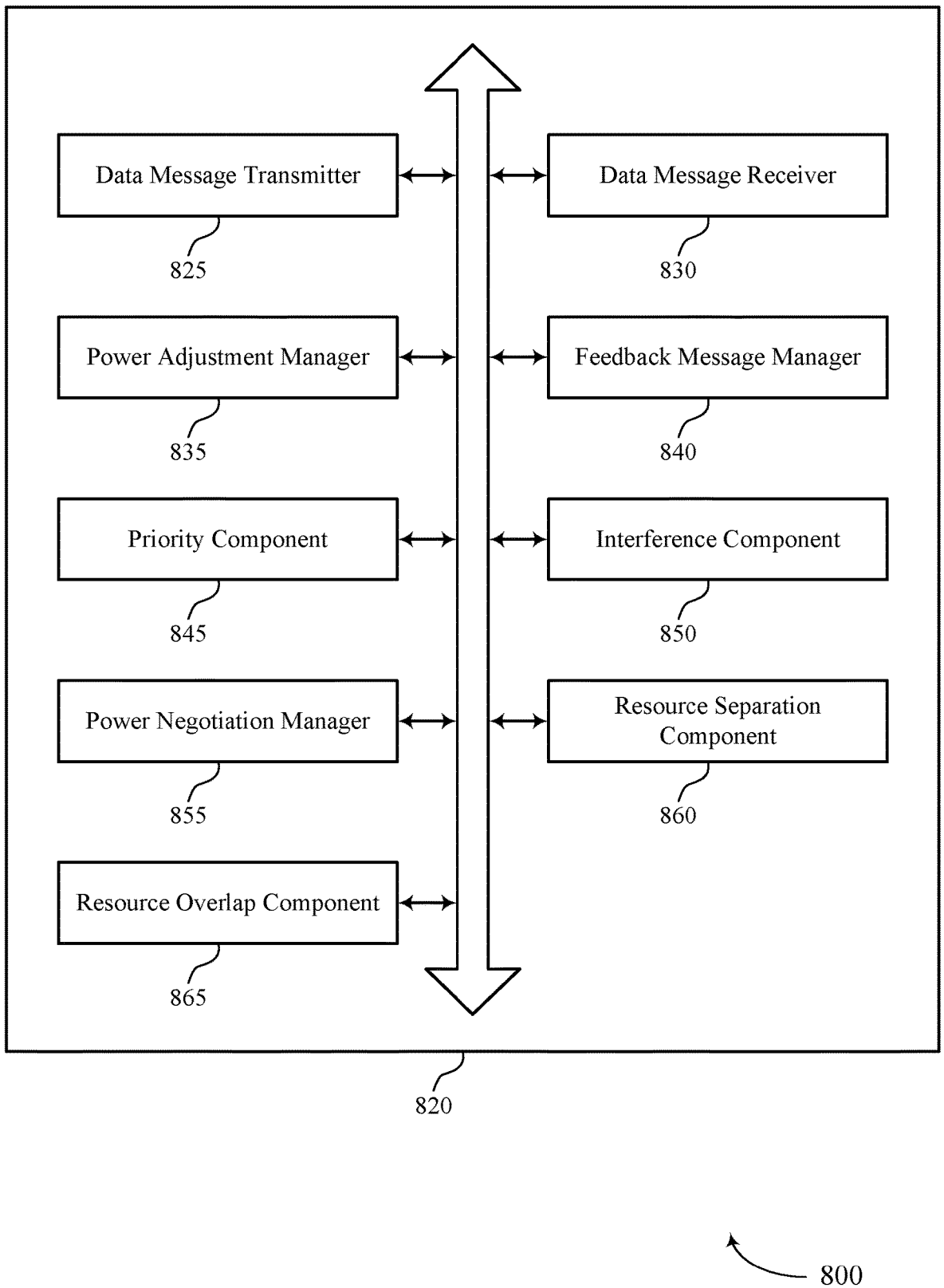
FIG. 8 shows a block diagram of a communications manager that supports transmit power adjustment for full duplex feedback in accordance with aspects of the present disclosure.

FIG. 8 shows a block diagram 800 of a communications manager 820 that supports transmit power adjustment for full duplex feedback in accordance with aspects of the present disclosure. The communications manager 820 may be an example of aspects of a communications manager 620, a communications manager 720, or both, as described herein. The communications manager 820, or various components thereof, may be an example of means for performing various aspects of transmit power adjustment for full duplex feedback as described herein. For example, the communications manager 820 may include a data message transmitter 825, a data message receiver 830, a power adjustment manager 835, a feedback message manager 840, a priority component 845, an interference component 850, a power negotiation manager 855, a resource separation component 860, a resource overlap component 865, or any combination thereof. Each of these components may communicate, directly or indirectly, with one another (e.g., via one or more buses).

The communications manager 820 may support wireless communication at a UE in accordance with examples as disclosed herein. The data message transmitter 825 may be configured as or otherwise support a means for transmitting a first data message, where the first data message corresponds to a first feedback resource for receiving a first feedback message responsive to the first data message. The data message receiver 830 may be configured as or otherwise support a means for receiving a second data message, where the second data message corresponds to a second feedback resource for transmitting a second feedback message responsive to the second data message, where the second feedback resource at least partially overlaps in a time domain with the first feedback resource. The power adjustment manager 835 may be configured as or otherwise support a means for adapting a transmit power for the second feedback message based on a priority of the first data message and a priority of the second data message. The feedback message manager 840 may be configured as or otherwise support a means for transmitting the second feedback message with the transmit power in the second feedback resource while receiving the first feedback message in the first feedback resource according to a full duplex communication mode.

In some examples, the priority component 845 may be configured as or otherwise support a means for determining the priority of the second data message is lower than the priority of the first data message, where adapting the transmit power for the second feedback message includes decreasing the transmit power for the second feedback message.

In some examples, the power adjustment manager 835 may be configured as or otherwise support a means for receiving a control message indicating a configuration for adapting the transmit power of the second feedback message.

In some examples, the configuration includes one or more tables of transmit power values for adapting the transmit power for the second feedback message. In some examples, the transmit power values are based on an amount of frequency separation between the first feedback resource and the second feedback resource, an amount of frequency overlap between the first feedback resource and the second feedback resource, an amount of interference associated with the first feedback resource, an amount of interference associated with the second feedback resource, a self-interference cancellation capability of the UE, or a combination thereof.

In some examples, to support adapting the transmit power, the power adjustment manager 835 may be configured as or otherwise support a means for adapting the transmit power for the second feedback message based on an amount of frequency separation between the first feedback resource and the second feedback resource.

In some examples, the resource separation component 860 may be configured as or otherwise support a means for determining the amount of frequency separation between the first feedback resource and the second feedback resource is below a threshold, where adapting the transmit power for the second feedback message includes decreasing the transmit power for the second feedback message.

In some examples, to support adapting the transmit power, the power adjustment manager 835 may be configured as or otherwise support a means for adapting the transmit power for the second feedback message based on an amount of frequency overlap between the first feedback resource and the second feedback resource.

In some examples, the resource overlap component 865 may be configured as or otherwise support a means for determining the amount of frequency overlap between the first feedback resource and the second feedback resource is above a threshold, where adapting the transmit power for the second feedback message includes decreasing the transmit power for the second feedback message.

In some examples, the interference component 850 may be configured as or otherwise support a means for calculating a first interference for a first subset of frequency resources of a feedback channel corresponding to the first feedback resource. In some examples, the interference component 850 may be configured as or otherwise support a means for calculating a second interference for a second subset of frequency resources of the feedback channel corresponding to the second feedback resource, where adapting the transmit power for the second feedback message is based on the first interference and the second interference.

In some examples, to support calculating the first interference and the second interference, the interference component 850 may be configured as or otherwise support a means for calculating a RSSI associated with the first subset of frequency resources and the second subset of frequency resources, or a RSRP associated with the first subset of frequency resources and the second subset of frequency resources, or both.

In some examples, the interference component 850 may be configured as or otherwise support a means for determining the RSSI, or the RSRP, or both are above a threshold, where adapting the transmit power for the second feedback message includes decreasing the transmit power for the second feedback message.

In some examples, to support adapting the transmit power, the power adjustment manager 835 may be configured as or otherwise support a means for adapting the transmit power for the second feedback message based on a capability of the UE.

In some examples, the capability of the UE includes a self-interference cancellation capability.

In some examples, the power negotiation manager 855 may be configured as or otherwise support a means for receiving a transmit power negotiation message from one or more other UEs, where the transmit power negotiation message indicates a set of transmit power parameters, where adapting the transmit power of the second feedback message is based on the set of transmit power parameters.

In some examples, the set of transmit power parameters includes a capability of the UE, a probability associated with communicating via the first feedback resource and the second feedback resource, a distance between the UE and the one or more other UEs, or a combination thereof.

Figure 9:
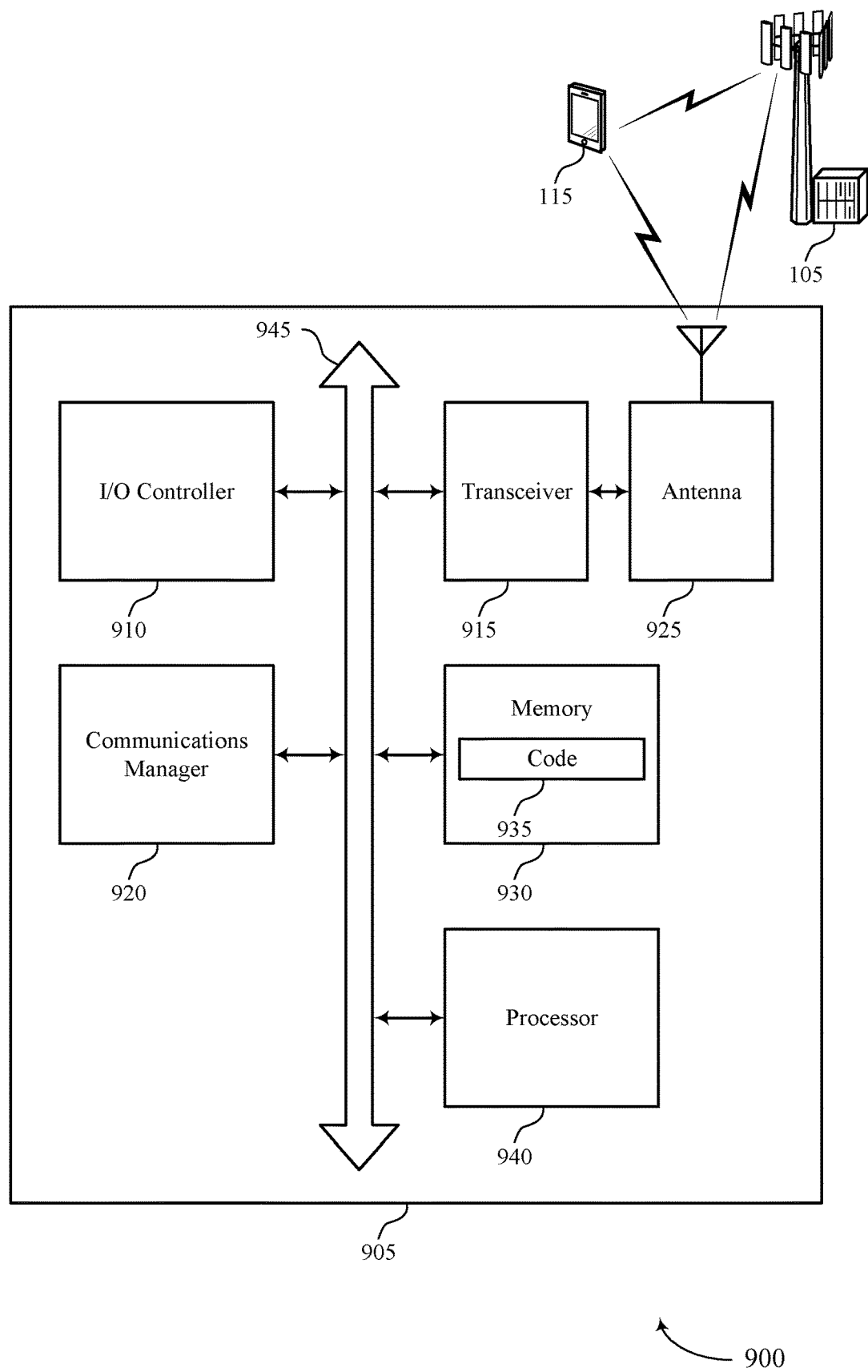
FIG. 9 shows a diagram of a system including a device that supports transmit power adjustment for full duplex feedback in accordance with aspects of the present disclosure.

FIG. 9 shows a diagram of a system 900 including a device 905 that supports transmit power adjustment for full duplex feedback in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting transmit power adjustment for full duplex feedback). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting a first data message, where the first data message corresponds to a first feedback resource for receiving a first feedback message responsive to the first data message. The communications manager 920 may be configured as or otherwise support a means for receiving a second data message, where the second data message corresponds to a second feedback resource for transmitting a second feedback message responsive to the second data message, where the second feedback resource at least partially overlaps in a time domain with the first feedback resource. The communications manager 920 may be configured as or otherwise support a means for adapting a transmit power for the second feedback message based on a priority of the first data message and a priority of the second data message. The communications manager 920 may be configured as or otherwise support a means for transmitting the second feedback message with the transmit power in the second feedback resource while receiving the first feedback message in the first feedback resource according to a full duplex communication mode.

By including or configuring the communications manager 920 in accordance with examples as described herein, the device 905 may support techniques for improved communication reliability and more efficient utilization of communication resources. For example, by adapting the transmit power for transmitting a feedback message according to one or more parameters, the device 905 may utilize a PSFCH for both receiving and transmitting feedback messages thereby increasing reliability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of transmit power adjustment for full duplex feedback as described herein, or the processor 940 and the memory 930 may be otherwise configured to perform or support such operations.

Figure 10:
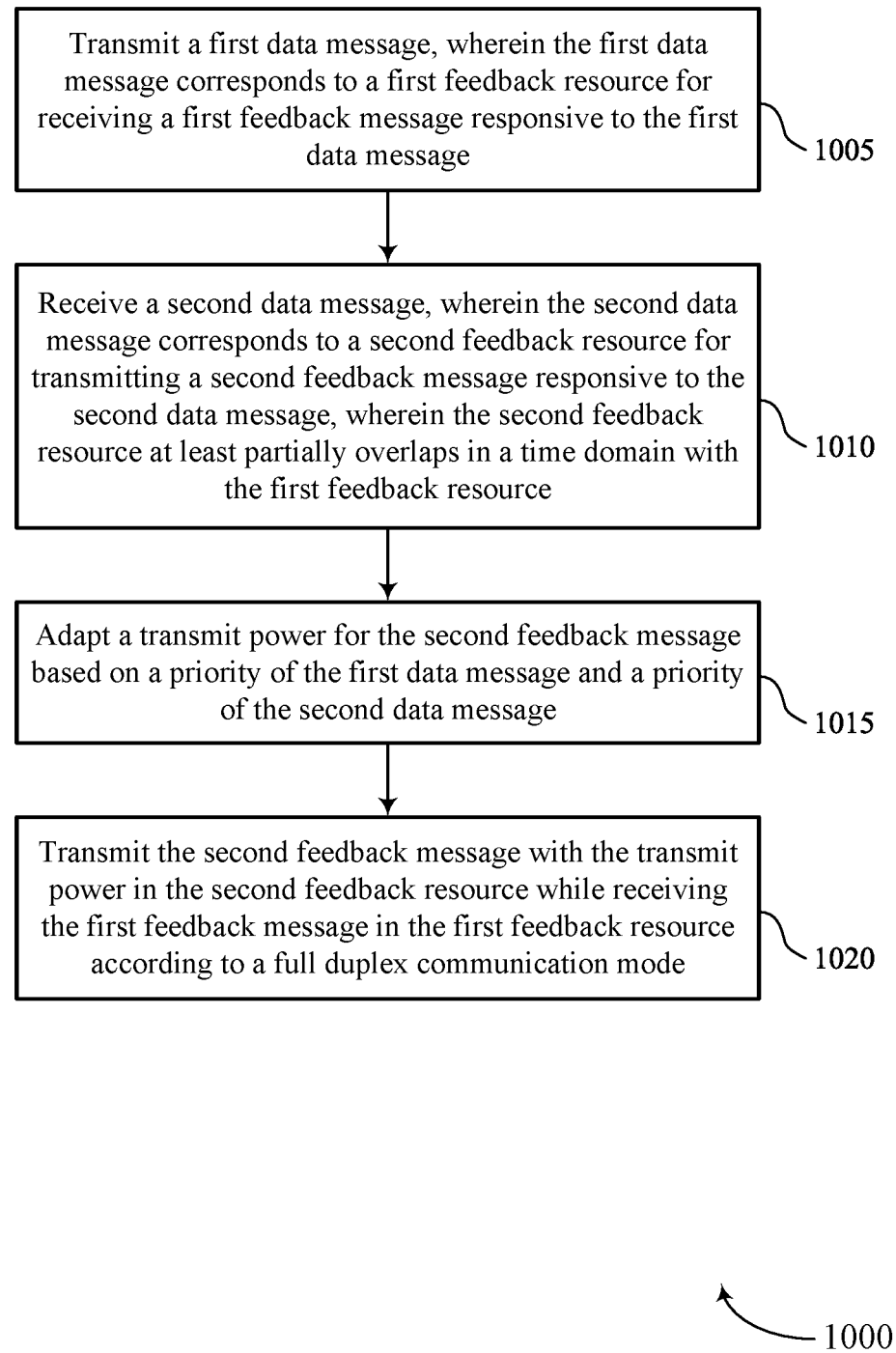
FIGS. 10 through 12 show flowcharts illustrating methods that support transmit power adjustment for full duplex feedback in accordance with aspects of the present disclosure.

FIG. 10 shows a flowchart illustrating a method 1000 that supports transmit power adjustment for full duplex feedback in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include transmitting a first data message, where the first data message corresponds to a first feedback resource for receiving a first feedback message responsive to the first data message. The operations of 1005 may be performed in accordance with examples as disclosed herein. In some examples, aspects of the operations of 1005 may be performed by a data message transmitter 825 as described with reference to FIG. 8.

At 1010, the method may include receiving a second data message, where the second data message corresponds to a second feedback resource for transmitting a second feedback message responsive to the second data message, where the second feedback resource at least partially overlaps in a time domain with the first feedback resource. The operations of 1010 may be performed in accordance with examples as disclosed herein. In some examples, aspects of the operations of 1010 may be performed by a data message receiver 830 as described with reference to FIG. 8.

At 1015, the method may include adapting a transmit power for the second feedback message based on a priority of the first data message and a priority of the second data message. The operations of 1015 may be performed in accordance with examples as disclosed herein. In some examples, aspects of the operations of 1015 may be performed by a power adjustment manager 835 as described with reference to FIG. 8.

At 1020, the method may include transmitting the second feedback message with the transmit power in the second feedback resource while receiving the first feedback message in the first feedback resource according to a full duplex communication mode. The operations of 1020 may be performed in accordance with examples as disclosed herein. In some examples, aspects of the operations of 1020 may be performed by a feedback message manager 840 as described with reference to FIG. 8.

Figure 11:
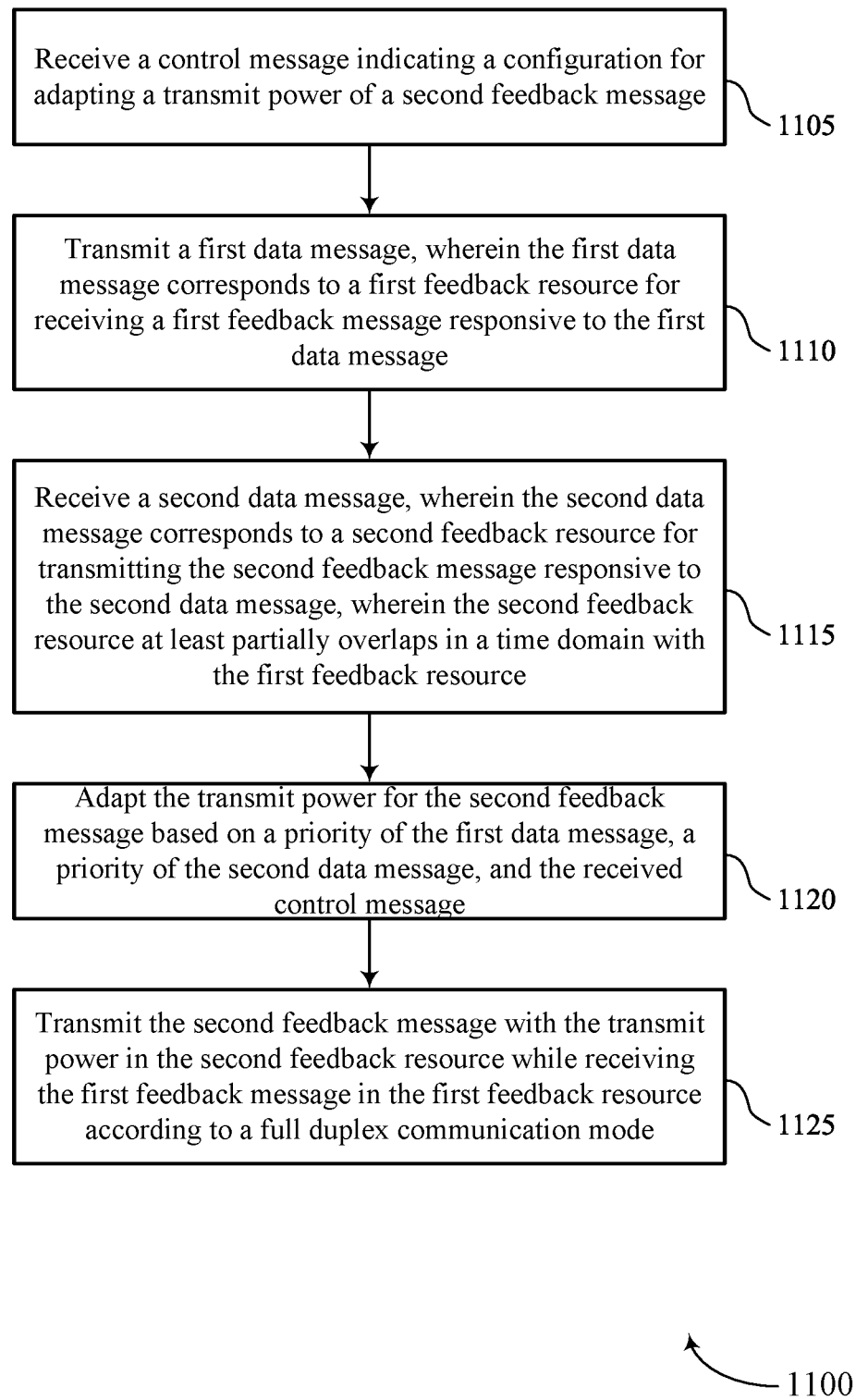

FIG. 11 shows a flowchart illustrating a method 1100 that supports transmit power adjustment for full duplex feedback in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving a control message indicating a configuration for adapting a transmit power of a second feedback message. The operations of 1105 may be performed in accordance with examples as disclosed herein. In some examples, aspects of the operations of 1105 may be performed by a power adjustment manager 835 as described with reference to FIG. 8.

At 1110, the method may include transmitting a first data message, where the first data message corresponds to a first feedback resource for receiving a first feedback message responsive to the first data message. The operations of 1110 may be performed in accordance with examples as disclosed herein. In some examples, aspects of the operations of 1110 may be performed by a data message transmitter 825 as described with reference to FIG. 8.

At 1115, the method may include receiving a second data message, where the second data message corresponds to a second feedback resource for transmitting the second feedback message responsive to the second data message, where the second feedback resource at least partially overlaps in a time domain with the first feedback resource. The operations of 1115 may be performed in accordance with examples as disclosed herein. In some examples, aspects of the operations of 1115 may be performed by a data message receiver 830 as described with reference to FIG. 8.

At 1120, the method may include adapting the transmit power for the second feedback message based on a priority of the first data message, a priority of the second data message and the received control message. The operations of 1120 may be performed in accordance with examples as disclosed herein. In some examples, aspects of the operations of 1120 may be performed by a power adjustment manager 835 as described with reference to FIG. 8.

At 1125, the method may include transmitting the second feedback message with the transmit power in the second feedback resource while receiving the first feedback message in the first feedback resource according to a full duplex communication mode. The operations of 1125 may be performed in accordance with examples as disclosed herein. In some examples, aspects of the operations of 1125 may be performed by a feedback message manager 840 as described with reference to FIG. 8.

Figure 12:
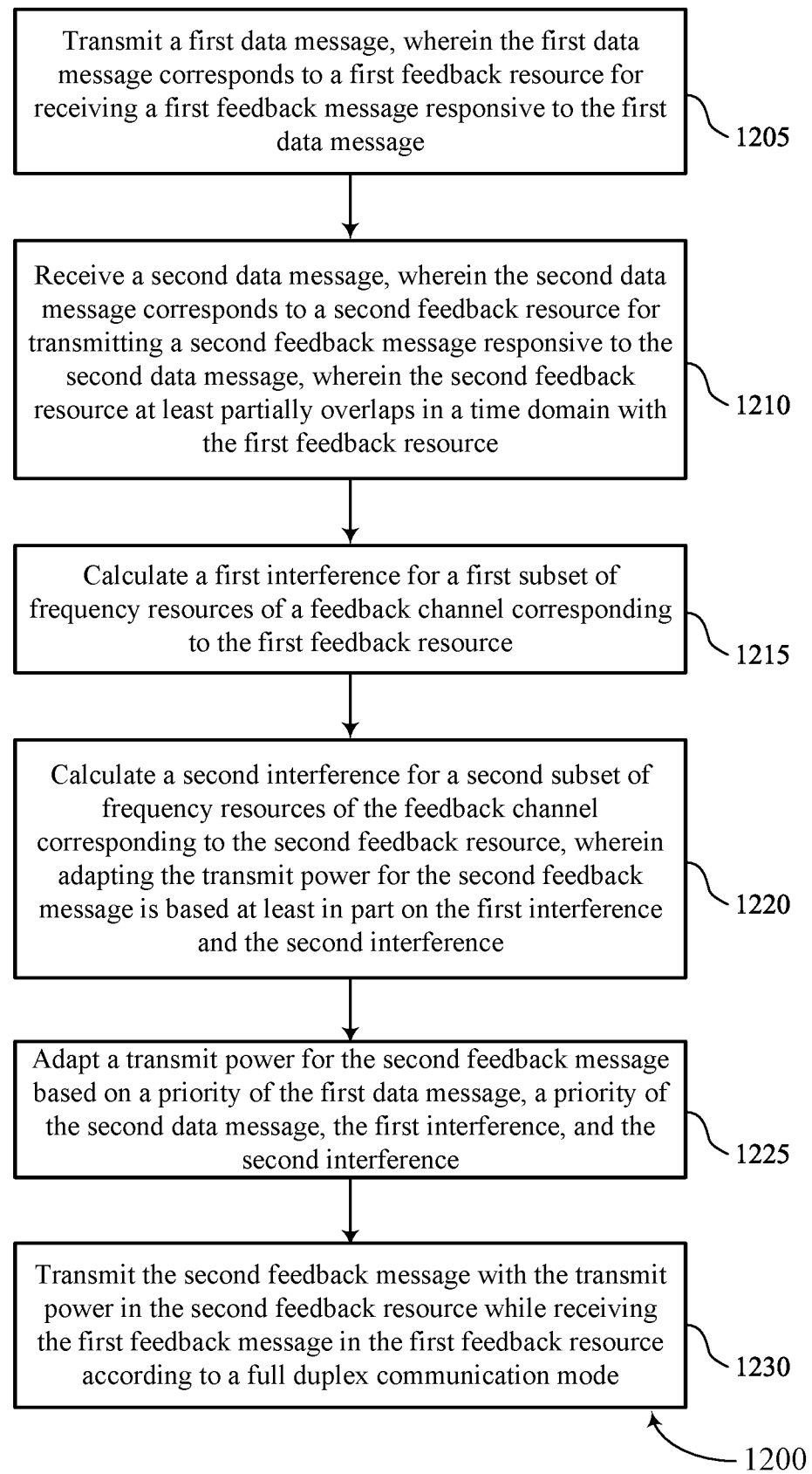

FIG. 12 shows a flowchart illustrating a method 1200 that supports transmit power adjustment for full duplex feedback in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include transmitting a first data message, where the first data message corresponds to a first feedback resource for receiving a first feedback message responsive to the first data message. The operations of 1205 may be performed in accordance with examples as disclosed herein. In some examples, aspects of the operations of 1205 may be performed by a data message transmitter 825 as described with reference to FIG. 8.

At 1210, the method may include receiving a second data message, where the second data message corresponds to a second feedback resource for transmitting a second feedback message responsive to the second data message, where the second feedback resource at least partially overlaps in a time domain with the first feedback resource. The operations of 1210 may be performed in accordance with examples as disclosed herein. In some examples, aspects of the operations of 1210 may be performed by a data message receiver 830 as described with reference to FIG. 8.

At 1215, the method may include calculating a first interference for a first subset of frequency resources of a feedback channel corresponding to the first feedback resource. The operations of 1215 may be performed in accordance with examples as disclosed herein. In some examples, aspects of the operations of 1215 may be performed by an interference component 850 as described with reference to FIG. 8.

At 1220, the method may include calculating a second interference for a second subset of frequency resources of the feedback channel corresponding to the second feedback resource, where adapting the transmit power for the second feedback message is based on the first interference and the second interference. The operations of 1220 may be performed in accordance with examples as disclosed herein. In some examples, aspects of the operations of 1220 may be performed by an interference component 850 as described with reference to FIG. 8.

At 1225, the method may include adapting a transmit power for the second feedback message based on a priority of the first data message, a priority of the second data message, the first interference, and the second interference. The operations of 1225 may be performed in accordance with examples as disclosed herein. In some examples, aspects of the operations of 1225 may be performed by a power adjustment manager 835 as described with reference to FIG. 8.

At 1230, the method may include transmitting the second feedback message with the transmit power in the second feedback resource while receiving the first feedback message in the first feedback resource according to a full duplex communication mode. The operations of 1230 may be performed in accordance with examples as disclosed herein.

In some examples, aspects of the operations of 1230 may be performed by a feedback message manager 840 as described with reference to FIG. 8. The following provides an overview of aspects of the present disclosure:

Aspect 1: A method for wireless communication at a UE, comprising: transmitting a first data message, wherein the first data message corresponds to a first feedback resource for receiving a first feedback message responsive to the first data message; receiving a second data message, wherein the second data message corresponds to a second feedback resource for transmitting a second feedback message responsive to the second data message, wherein the second feedback resource at least partially overlaps in a time domain with the first feedback resource; adapting a transmit power for the second feedback message based at least in part on a priority of the first data message and a priority of the second data message; and transmitting the second feedback message with the transmit power in the second feedback resource while receiving the first feedback message in the first feedback resource according to a full duplex communication mode.

Aspect 2: The method of aspect 1, further comprising: determining the priority of the second data message is lower than the priority of the first data message, wherein adapting the transmit power for the second feedback messages comprises decreasing the transmit power for the second feedback message.

Aspect 3: The method of any of aspects 1 through 2, further comprising: receiving a control message indicating a configuration for adapting the transmit power of the second feedback message.

Aspect 4: The method of aspect 3, wherein the configuration includes one or more tables of transmit power values for adapting the transmit power for the second feedback message, the transmit power values are based at least in part on an amount of frequency separation between the first feedback resource and the second feedback resource, an amount of frequency overlap between the first feedback resource and the second feedback resource, an amount of interference associated with the first feedback resource, an amount of interference associated with the second feedback resource, a self-interference cancellation capability of the UE, or a combination thereof.

Aspect 5: The method of any of aspects 1 through 4, wherein adapting the transmit power further comprises: adapting the transmit power for the second feedback message based at least in part on an amount of frequency separation between the first feedback resource and the second feedback resource.

Aspect 6: The method of aspect 5, further comprising: determining the amount frequency separation between the first feedback resource and the second feedback resource is below a threshold, wherein adapting the transmit power for the second feedback message comprises decreasing the transmit power for the second feedback message.

Aspect 7: The method of any of aspects 1 through 6, wherein adapting the transmit power further comprises: adapting the transmit power for the second feedback message based at least in part on an amount of frequency overlap between the first feedback resource and the second feedback resource.

Aspect 8: The method of aspect 7, further comprising: determining the amount of frequency overlap between the first feedback resource and the second feedback resource is above a threshold, wherein adapting the transmit power for the second feedback message comprises decreasing the transmit power for the second feedback message.

Aspect 9: The method of any of aspects 1 through 8, further comprising: calculating a first interference for a first subset of frequency resources of a feedback channel corresponding to the first feedback resource; and calculating a second interference for a second subset of frequency resources of the feedback channel corresponding to the second feedback resource, wherein adapting the transmit power for the second feedback message is based at least in part on the first interference and the second interference.

Aspect 10: The method of aspect 9, wherein calculating the first interference and the second interference further comprises: calculating an RSSI associated with the first subset of frequency resources and the second subset of frequency resources, or an RSRP associated with the first subset of frequency resources and the second subset of frequency resources, or both.

Aspect 11: The method of aspect 10, further comprising: determining the RSSI, or the RSRP, or both are above a threshold, wherein adapting the transmit power for the second feedback message comprises decreasing the transmit power for the second feedback message.

Aspect 12: The method of any of aspects 1 through 11, wherein adapting the transmit power further comprises: adapting the transmit power for the second feedback message based at least in part on a capability of the UE.

Aspect 13: The method of aspect 12, wherein the capability of the UE comprises a self-interference cancellation capability.

Aspect 14: The method of any of aspects 1 through 13, further comprising: receiving a transmit power negotiation message from one or more other UEs, wherein the transmit power negotiation message indicates a set of transmit power parameters, wherein adapting the transmit power of the second feedback message is based at least in part on the set of transmit power parameters.

Aspect 15: The method of aspect 14, wherein the set of transmit power parameters comprises a capability of the UE, a probability associated with communicating via the first feedback resource and the second feedback resource, a distance between the UE and the one or more other UEs, or a combination thereof.

Aspect 16: An apparatus for wireless communication at a UE, comprising a processor; memory coupled with the processor; and instructions stored in the memory and executable by the processor to cause the apparatus to perform a method of any of aspects 1 through 15.

Aspect 17: An apparatus for wireless communication at a UE, comprising at least one means for performing a method of any of aspects 1 through 15.

Aspect 18: A non-transitory computer-readable medium storing code for wireless communication at a UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting a first data message, wherein the first data message corresponds to a first feedback resource for receiving a first feedback message responsive to the first data message;
   receiving a second data message, wherein the second data message corresponds to a second feedback resource for transmitting a second feedback message responsive to the second data message, and wherein the second feedback resource at least partially overlaps in a time domain with the first feedback resource;
   adapting a transmit power for the second feedback message based at least in part on a priority of the first data message and a priority of the second data message; and
   transmitting the second feedback message with the transmit power in the second feedback resource while receiving the first feedback message in the first feedback resource according to a full duplex communication mode.

2. The method of claim 1, further comprising:
determining the priority of the second data message is lower than the priority of the first data message, wherein adapting the transmit power for the second feedback message comprises decreasing the transmit power for the second feedback message.

3. The method of claim 1, further comprising:
receiving a control message indicating a configuration for adapting the transmit power of the second feedback message.

4. The method of claim 3, wherein:
the configuration includes one or more tables of transmit power values for adapting the transmit power for the second feedback message; and
the transmit power values are based at least in part on an amount of frequency separation between the first feedback resource and the second feedback resource, an amount of frequency overlap between the first feedback resource and the second feedback resource, an amount of interference associated with the first feedback resource, an amount of interference associated with the second feedback resource, a self-interference cancellation capability of the UE, or a combination thereof.

5. The method of claim 1, wherein adapting the transmit power further comprises:
adapting the transmit power for the second feedback message based at least in part on an amount of frequency separation between the first feedback resource and the second feedback resource.

6. The method of claim 5, further comprising:
determining the amount of frequency separation between the first feedback resource and the second feedback resource is below a threshold, wherein adapting the transmit power for the second feedback message comprises decreasing the transmit power for the second feedback message.

7. The method of claim 1, wherein adapting the transmit power further comprises:
adapting the transmit power for the second feedback message based at least in part on an amount of frequency overlap between the first feedback resource and the second feedback resource.

8. The method of claim 7, further comprising:
determining the amount of frequency overlap between the first feedback resource and the second feedback resource is above a threshold, wherein adapting the transmit power for the second feedback message comprises decreasing the transmit power for the second feedback message.

9. The method of claim 1, further comprising:
calculating a first interference for a first subset of frequency resources of a feedback channel corresponding to the first feedback resource; and
calculating a second interference for a second subset of frequency resources of the feedback channel corresponding to the second feedback resource, wherein adapting the transmit power for the second feedback message is based at least in part on the first interference and the second interference.

10. The method of claim 9, wherein calculating the first interference and the second interference further comprises:
calculating a received signal strength indicator associated with the first subset of frequency resources and the second subset of frequency resources, or a reference signal received power associated with the first subset of frequency resources and the second subset of frequency resources, or both.

11. The method of claim 10, further comprising:
determining the received signal strength indicator, or the reference signal received power, or both are above a threshold, wherein adapting the transmit power for the second feedback message comprises decreasing the transmit power for the second feedback message.

12. The method of claim 1, wherein adapting the transmit power further comprises:
adapting the transmit power for the second feedback message based at least in part on a capability of the UE.

13. The method of claim 12, wherein the capability of the UE comprises a self-interference cancellation capability.

14. The method of claim 1, further comprising:
receiving a transmit power negotiation message from one or more other UEs, wherein the transmit power negotiation message indicates a set of transmit power parameters, wherein adapting the transmit power of the second feedback message is based at least in part on the set of transmit power parameters.

15. The method of claim 14, wherein the set of transmit power parameters comprises a capability of the UE, a probability associated with communicating via the first feedback resource and the second feedback resource, a distance between the UE and the one or more other UEs, or a combination thereof.

16. An apparatus for wireless communication at a user equipment (UE), comprising:
a processor;
memory coupled with the processor; and
instructions stored in the memory and executable by the processor to cause the apparatus to:
transmit a first data message, wherein the first data message corresponds to a first feedback resource for receiving a first feedback message responsive to the first data message;
receive a second data message, wherein the second data message corresponds to a second feedback resource for transmitting a second feedback message responsive to the second data message, and wherein the second feedback resource at least partially overlaps in a time domain with the first feedback resource;
adapt a transmit power for the second feedback message based at least in part on a priority of the first data message and a priority of the second data message; and
transmit the second feedback message with the transmit power in the second feedback resource while receiving the first feedback message in the first feedback resource according to a full duplex communication mode.

17. The apparatus of claim 16, wherein the instructions are further executable by the processor to cause the apparatus to:
determine the priority of the second data message is lower than the priority of the first data message, wherein adapting the transmit power for the second feedback message comprises decreasing the transmit power for the second feedback message.

18. The apparatus of claim 16, wherein the instructions are further executable by the processor to cause the apparatus to:
receive a control message indicating a configuration for adapting the transmit power of the second feedback message.

19. The apparatus of claim 18, wherein:
the configuration includes one or more tables of transmit power values for adapting the transmit power for the second feedback message; and
the transmit power values are based at least in part on an amount of frequency separation between the first feedback resource and the second feedback resource, an amount of frequency overlap between the first feedback resource and the second feedback resource, an amount of interference associated with the first feedback resource, an amount of interference associated with the second feedback resource, a self-interference cancellation capability of the UE, or a combination thereof.

20. The apparatus of claim 16, wherein the instructions to adapt the transmit power are further executable by the processor to cause the apparatus to:
adapt the transmit power for the second feedback message based at least in part on an amount of frequency separation between the first feedback resource and the second feedback resource.

21. The apparatus of claim 20, wherein the instructions are further executable by the processor to cause the apparatus to:
determine the amount of frequency separation between the first feedback resource and the second feedback resource is below a threshold, wherein adapting the transmit power for the second feedback message comprises decreasing the transmit power for the second feedback message.

22. The apparatus of claim 16, wherein the instructions to adapt the transmit power are further executable by the processor to cause the apparatus to:
adapt the transmit power for the second feedback message based at least in part on an amount of frequency overlap between the first feedback resource and the second feedback resource.

23. The apparatus of claim 22, wherein the instructions are further executable by the processor to cause the apparatus to:
determine the amount of frequency overlap between the first feedback resource and the second feedback resource is above a threshold, wherein adapting the transmit power for the second feedback message comprises decreasing the transmit power for the second feedback message.

24. The apparatus of claim 16, wherein the instructions are further executable by the processor to cause the apparatus to:
calculate a first interference for a first subset of frequency resources of a feedback channel corresponding to the first feedback resource; and
calculate a second interference for a second subset of frequency resources of the feedback channel corresponding to the second feedback resource, wherein adapting the transmit power for the second feedback message is based at least in part on the first interference and the second interference.

25. The apparatus of claim 24, wherein the instructions to calculate the first interference and the second interference are further executable by the processor to cause the apparatus to:
calculate a received signal strength indicator associated with the first subset of frequency resources and the second subset of frequency resources, or a reference signal received power associated with the first subset of frequency resources and the second subset of frequency resources, or both.

26. The apparatus of claim 25, wherein the instructions are further executable by the processor to cause the apparatus to:
determine the received signal strength indicator, or the reference signal received power, or both are above a threshold, wherein adapting the transmit power for the second feedback message comprises decreasing the transmit power for the second feedback message.

27. The apparatus of claim 16, wherein the instructions to adapt the transmit power are further executable by the processor to cause the apparatus to:
adapt the transmit power for the second feedback message based at least in part on a capability of the UE.

28. The apparatus of claim 27, wherein the capability of the UE comprises a self-interference cancellation capability.

29. The apparatus of claim 16, wherein the instructions are further executable by the processor to cause the apparatus to:
receive a transmit power negotiation message from one or more other UEs, wherein the transmit power negotiation message indicates a set of transmit power parameters, wherein adapting the transmit power of the second feedback message is based at least in part on the set of transmit power parameters.

30. The apparatus of claim 29, wherein the set of transmit power parameters comprises a capability of the UE, a probability associated with communicating via the first feedback resource and the second feedback resource, a distance between the UE and the one or more other UEs, or a combination thereof.

* * * * *